US 6,589,631 B1
Jul. 8, 2003

(54) FLASHLESS RUBBER FLOOR MAT AND METHOD

(75) Inventors: Akihito Suzuki, Yamagata-ken (JP); Robert C. Kerr, LaGrange, GA (US); Amy K. Streeton, LaGrange, GA (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 09/679,467

(22) Filed: Oct. 4, 2000

(51) Int. Cl.[7] .............................. B32B 3/00; B29D 31/00; A46D 1/00; A47G 9/06; A47K 7/02

(52) U.S. Cl. ...................... 428/172; 428/159; 428/187; 428/215; 264/243; 264/257; 156/72; 156/244; 156/244.15; 15/215; 15/217; 15/238; 5/417

(58) Field of Search ................. 428/156, 122, 428/159, 215, 316.6, 187; 156/242, 228, 241, 72, 244.15, 297; 5/417, 420; 264/257, 293, 316, 320, 243; 15/215, 217, 238; 52/177

(56) References Cited

U.S. PATENT DOCUMENTS

| | | | |
|---|---|---|---|
| 1,008,618 A | 11/1911 | Skowronski et al. | |
| 1,805,038 A | 5/1931 | Derr | 428/493 |
| 3,016,317 A | 1/1962 | Brunner | 154/49 |
| 3,197,357 A | 7/1965 | Schulpen | 161/116 |
| 3,833,440 A | 9/1974 | Kashiwa et al. | 156/244 |
| 3,982,977 A | 9/1976 | Gordon | 156/72 |
| 4,045,605 A | 8/1977 | Breens et al. | 428/88 |
| 4,262,048 A | 4/1981 | Mitchell | 428/99 |
| 4,332,847 A | 6/1982 | Rowland | 428/156 |
| 4,353,944 A | 10/1982 | Tarui | 428/74 |
| 4,377,016 A | 3/1983 | Niermeijer | 15/215 |
| 4,439,475 A | 3/1984 | Lang | 428/92 |
| 4,465,720 A | 8/1984 | Bell et al. | 428/85 |
| 4,587,148 A | 5/1986 | Campbell et al. | 428/88 |
| 4,710,415 A | 12/1987 | Slosberg et al. | 428/48 |
| 4,711,191 A | 12/1987 | Schwartz | 112/410 |

(List continued on next page.)

FOREIGN PATENT DOCUMENTS

| | | | |
|---|---|---|---|
| CH | 614853 | 7/1976 | .......... A47G/27/02 |
| EP | 0325040 | 1/1990 | .......... A47G/27/04 |
| EP | 0351041 | 1/1990 | .......... A47G/27/02 |
| EP | 1 075 936 | 2/2001 | |
| EP | 1 075 937 | 2/2001 | |
| FR | 1211755 | 10/1959 | |
| FR | 2544659 | 10/1984 | .......... B32B/5/18 |
| GB | 2213099 A | 12/1987 | .......... B44C/1/16 |
| GB | 2244429 A | 5/1991 | .......... A47G/27/02 |
| JP | 67224 | 6/1978 | .......... A47G/27/02 |
| JP | 2112437 | 4/1990 | .......... D03D/27/00 |
| WO | 9530040 | 11/1995 | .......... D05C/15/04 |
| WO | 9904942 | 2/1996 | .......... B26D/1/03 |
| WO | 9637645 | 11/1996 | .......... D02G/3/04 |
| WO | 01/21875 | 3/2001 | |

*Primary Examiner*—Donald J. Loney
(74) *Attorney, Agent, or Firm*—Terry T. Moyer; Daniel R. Alexander

(57) ABSTRACT

A flashless floor mat or product and method are provided. At least one embodiment of this invention relates to a flashless cushioned dust control mat article wherein the mat comprises at least two distinct layers of rubber, one comprising foam rubber, the other comprising solid rubber. The solid rubber layer is present over the foam rubber layer on the side of the mat in which at least one integrated rubber protrusion is present to provide cushioning characteristics. The solid rubber layer acts as a cap or barrier for the foam rubber layer, particularly over the integrated protrusion or protrusions, in order to provide a mat which is resilient, will not easily degrade in its modulus strength after appreciable use and/or washing within industrial cleaning processes, and will not exhibit appreciable cracking or breaking, particularly within the integrated protrusion(s), after standard use for pedestrian traffic. A method of producing such an inventive cushioned floor mat article is also provided.

32 Claims, 25 Drawing Sheets

U.S. PATENT DOCUMENTS

| | | | | |
|---|---|---|---|---|
| 4,741,065 A | 5/1988 | Parkins | ........................ | 15/217 |
| 4,794,027 A | 12/1988 | Hering | ........................ | 428/68 |
| 4,820,566 A | 4/1989 | Heine et al. | ................... | 428/88 |
| 4,822,669 A | 4/1989 | Roga | ........................ | 428/287 |
| 4,886,692 A | 12/1989 | Kerr et al. | ................... | 428/82 |
| 4,902,465 A | 2/1990 | Kerr et al. | ................. | 264/257 |
| 4,902,554 A | 2/1990 | Lang | ........................ | 428/195 |
| 5,055,333 A | 10/1991 | Heine et al. | ................... | 428/88 |
| 5,170,526 A | 12/1992 | Murray | ........................ | 15/215 |
| 5,227,214 A | 7/1993 | Kerr et al. | .................... | 428/95 |
| 5,304,272 A | 4/1994 | Rohrbacker et al. | ......... | 156/209 |
| 5,305,565 A | 4/1994 | Nagahama et al. | ........... | 52/177 |
| 5,443,885 A | 8/1995 | Wilson | ........................ | 428/121 |
| 5,645,914 A | 7/1997 | Horowitz | ..................... | 428/81 |
| 5,902,662 A | 5/1999 | Kerr | ........................... | 428/95 |
| 5,928,446 A | 7/1999 | Rockwell, Jr. et al. | ........ | 156/72 |
| 5,932,317 A | 8/1999 | Kerr | ........................... | 428/192 |
| 6,296,919 B1 | 10/2001 | Rockwell, Jr. et al. | ....... | 428/85 |
| 6,303,068 B1 | 10/2001 | Kerr et al. | .................. | 264/293 |
| 6,340,514 B1 | 1/2002 | Kerr et al. | ................... | 428/159 |
| 6,420,015 B1 | 7/2002 | Nord et al. | .................. | 428/172 |

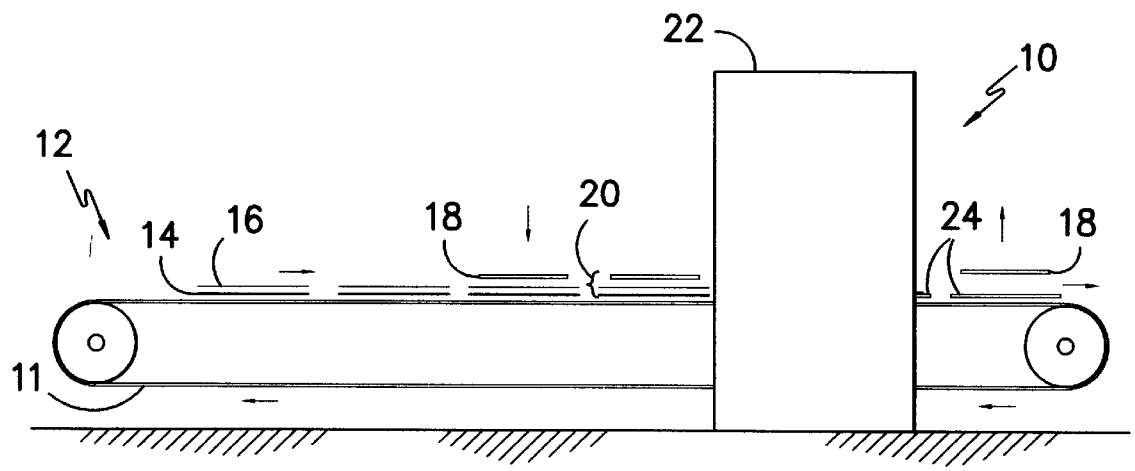
FIG. -1-
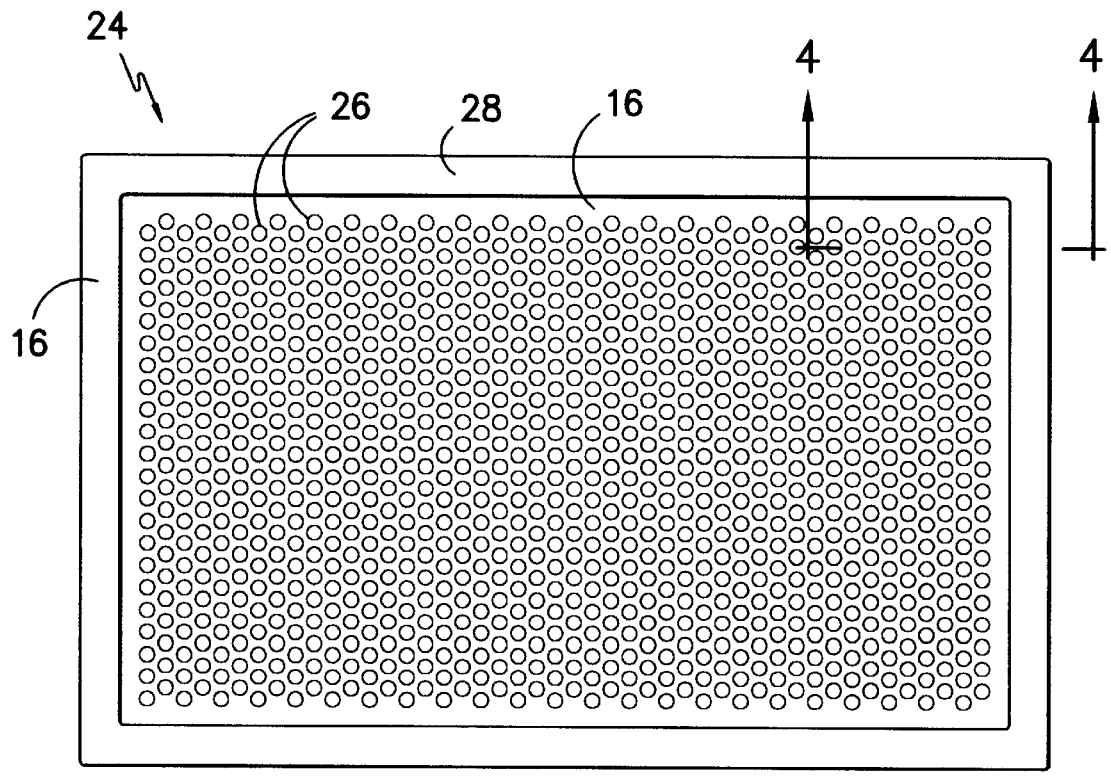
FIG. -2-

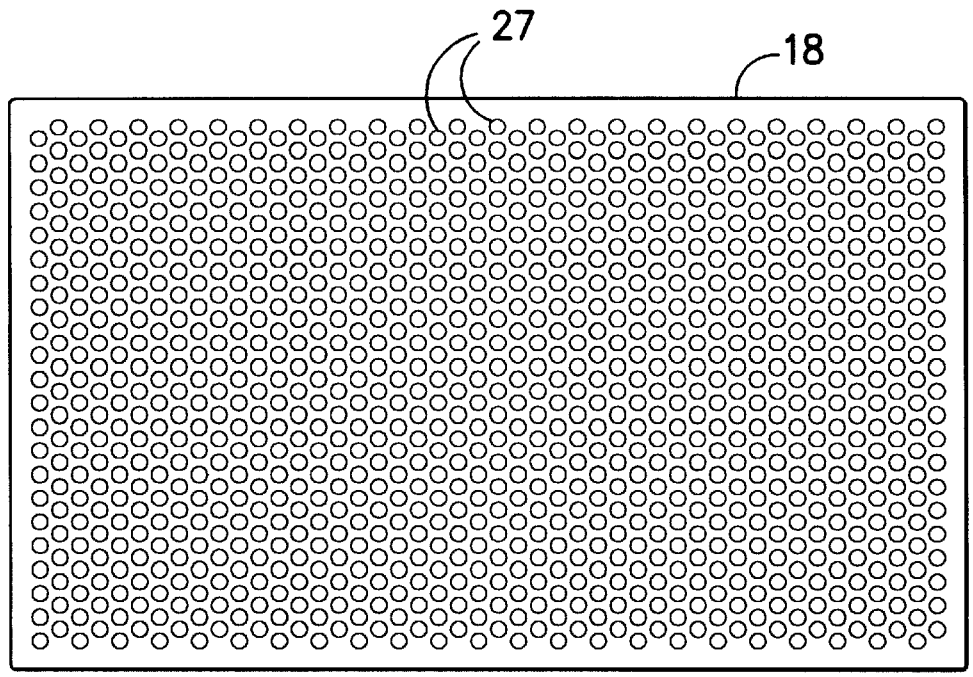
FIG. -3-
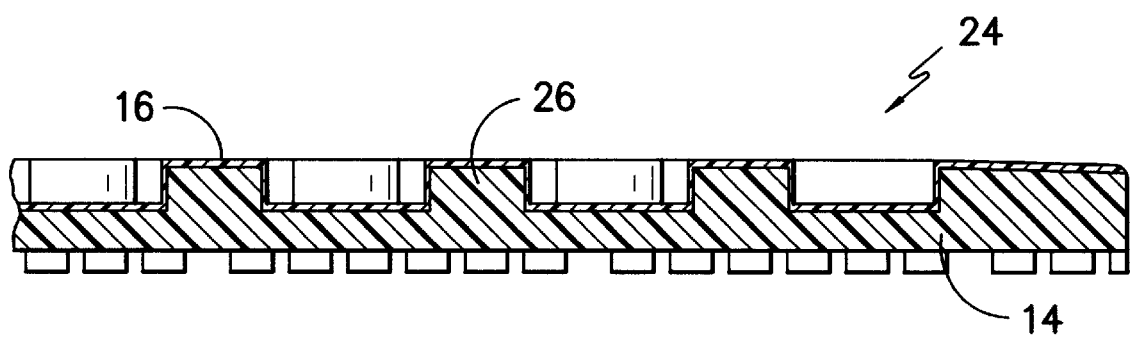
FIG. -4-

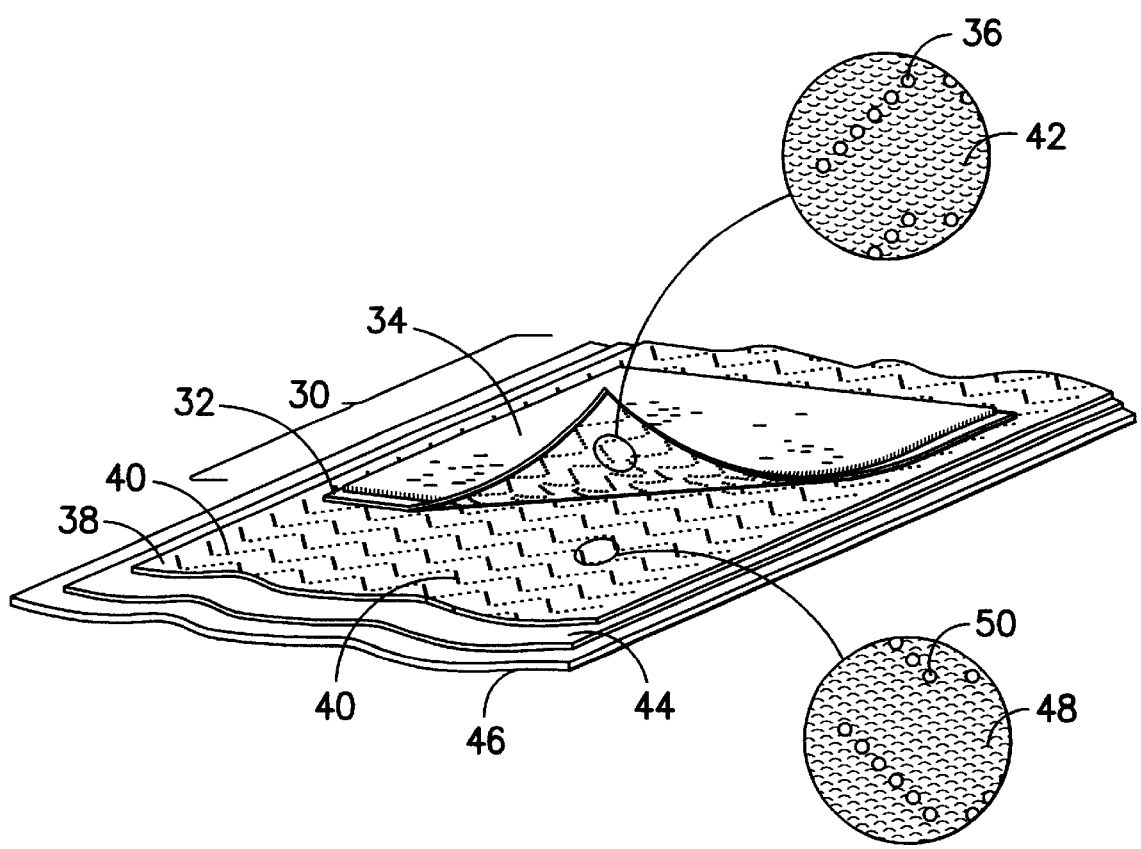
FIG. —5—

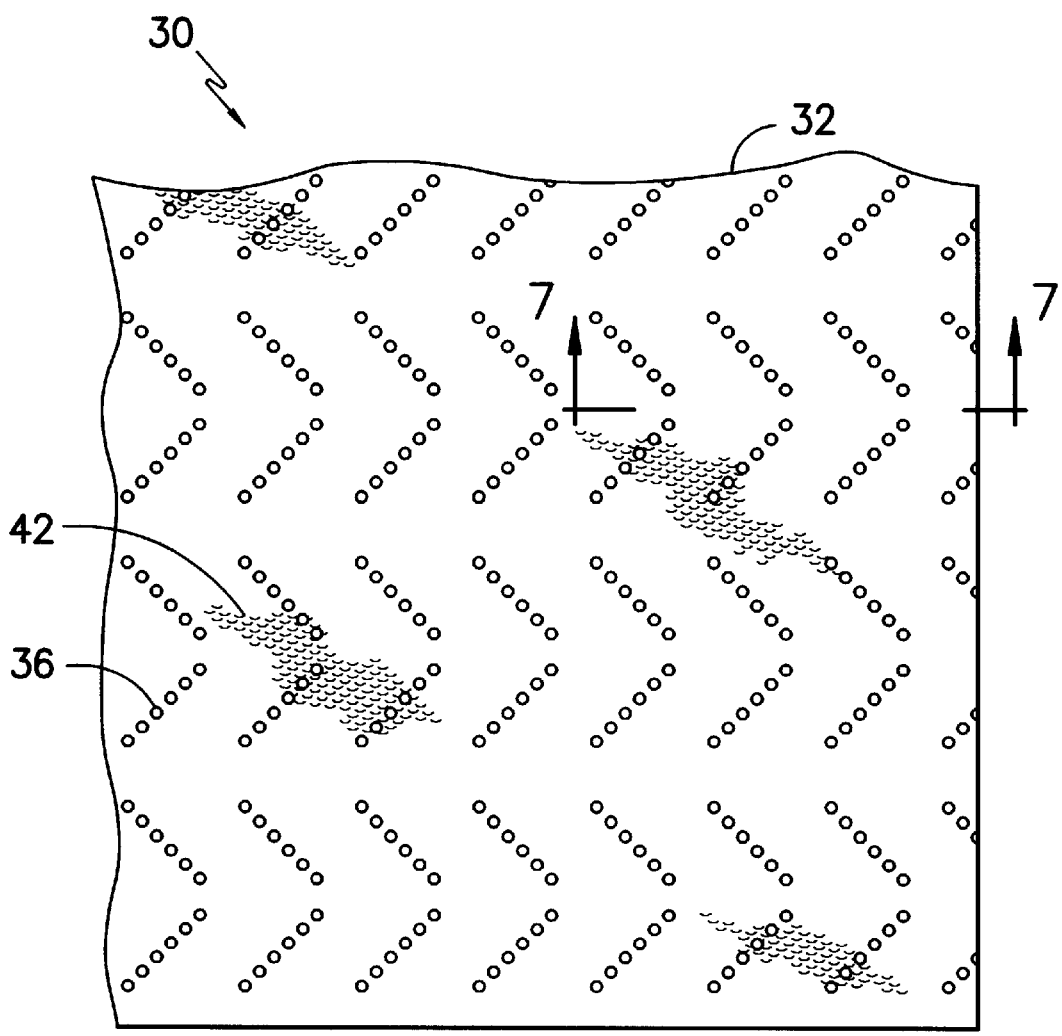
FIG. —6—
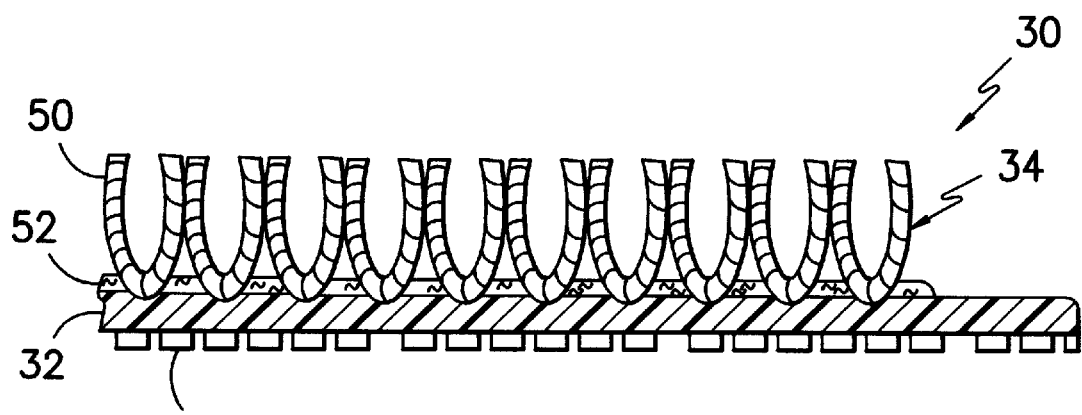
FIG. —7—

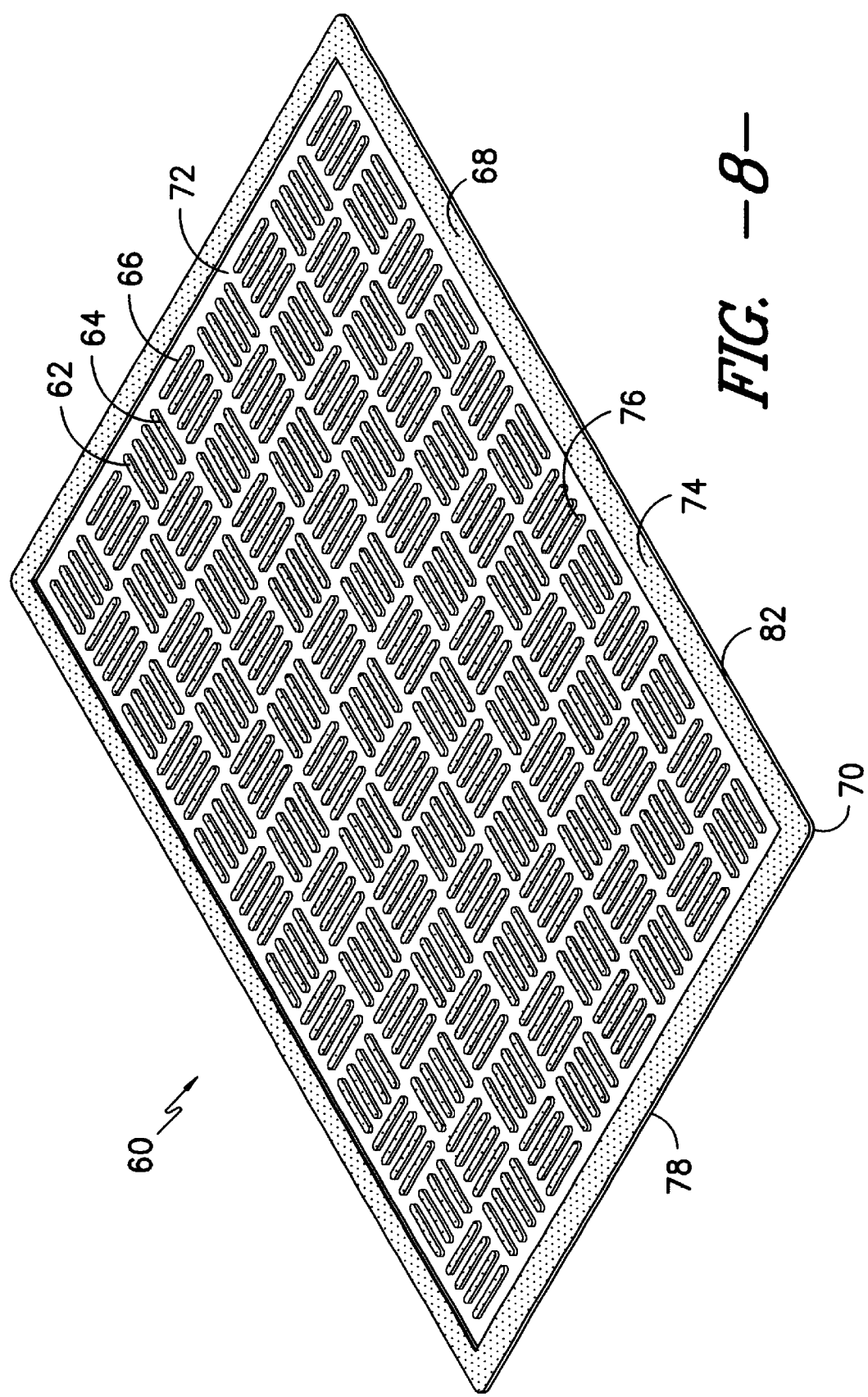

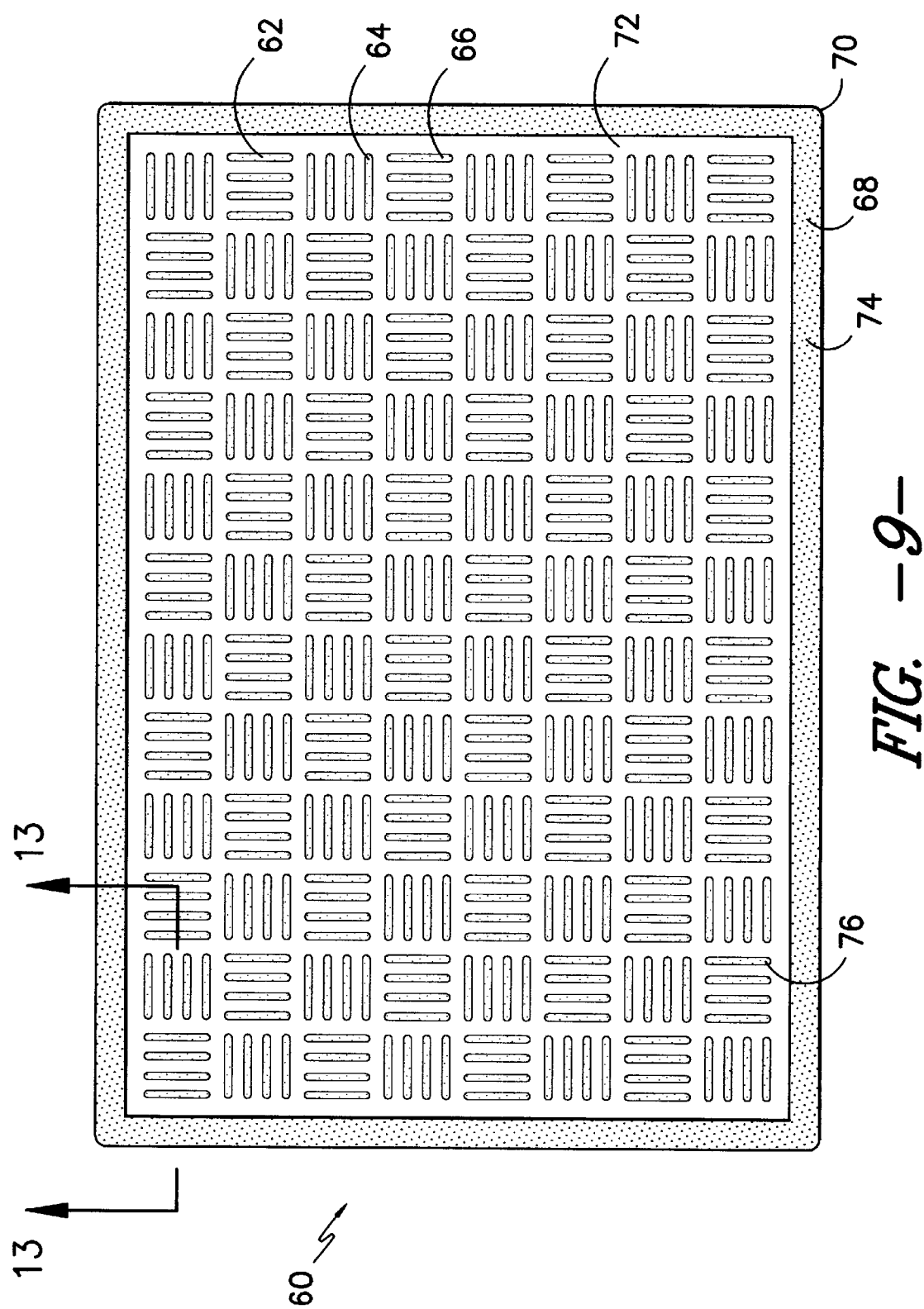
FIG. —9—

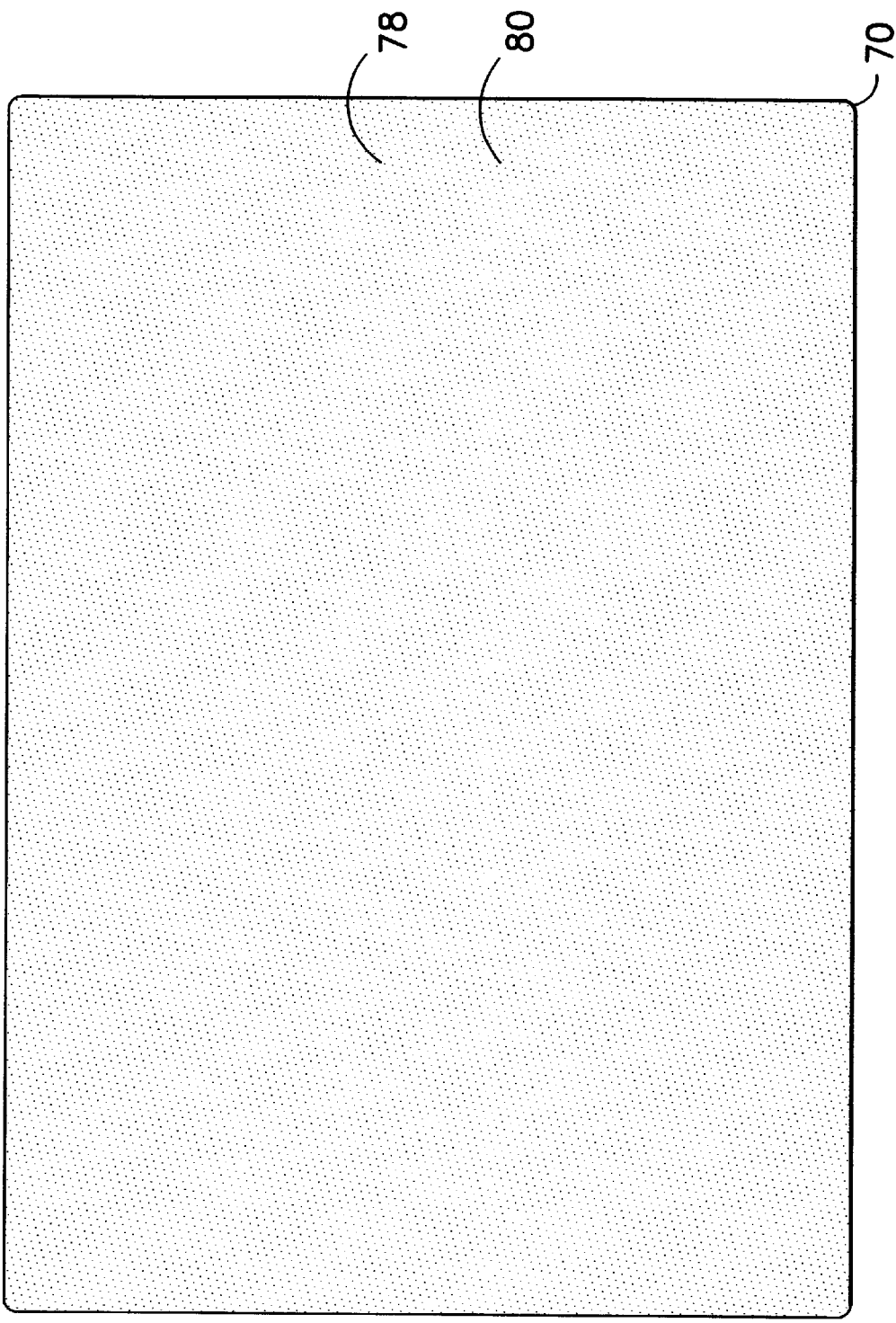
FIG. -10-

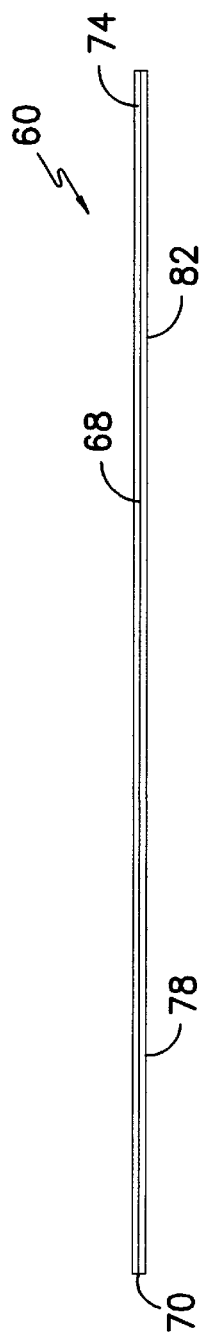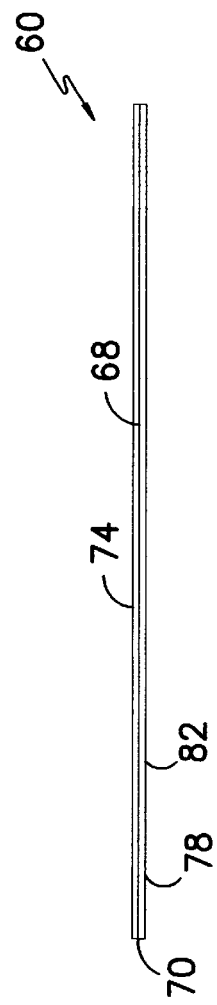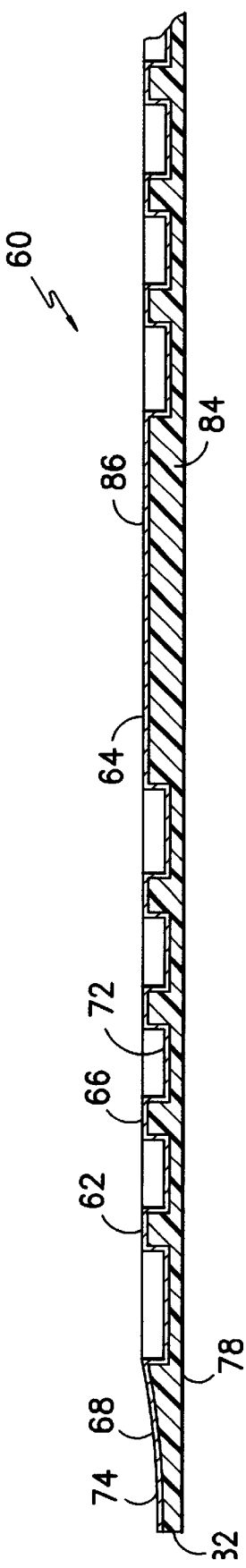

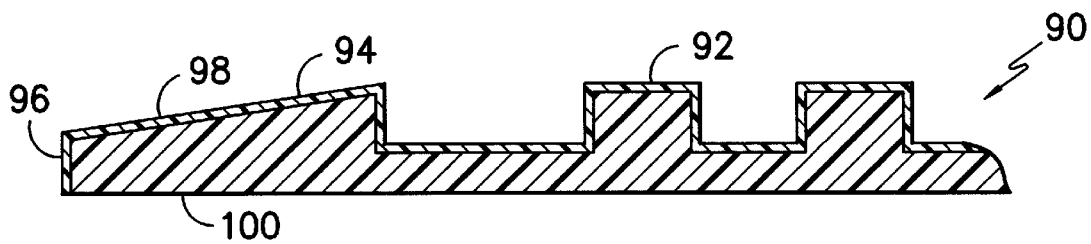
FIG. -14-
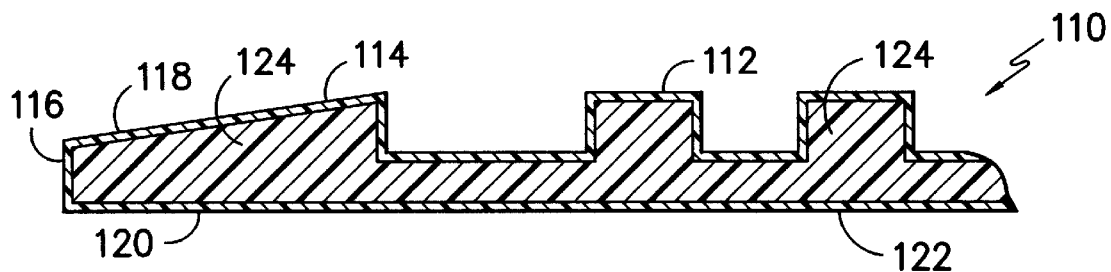
FIG. -15-
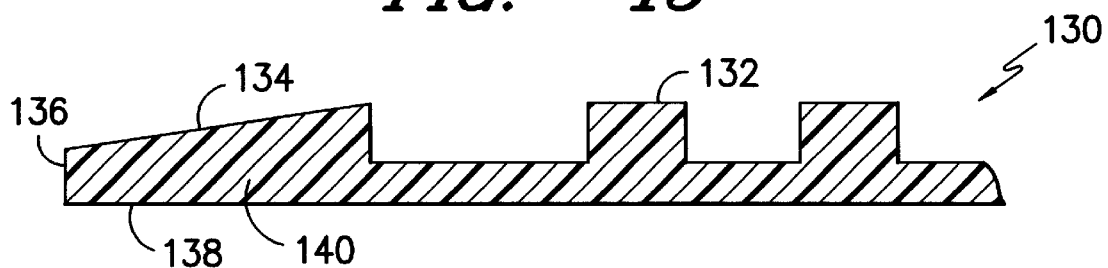
FIG. -16-
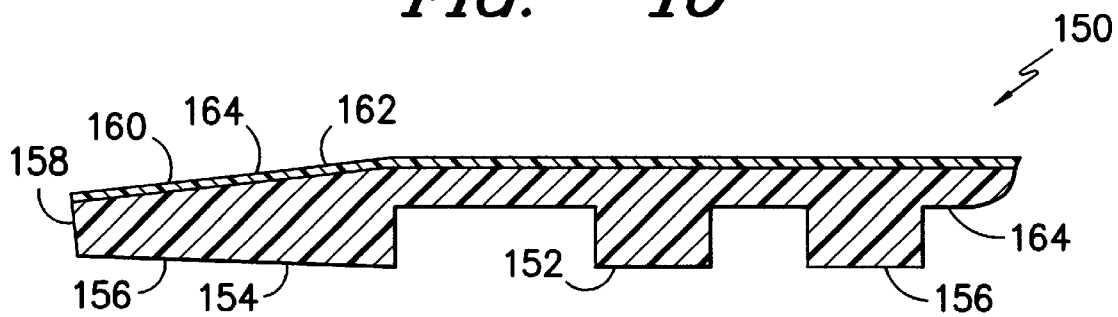
FIG. -17-
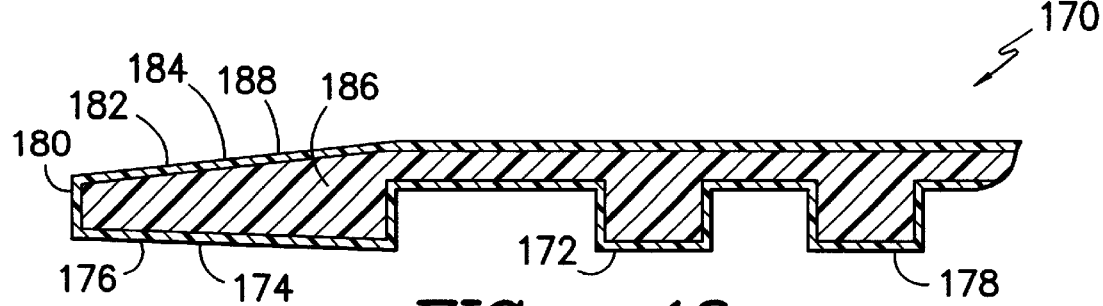
FIG. -18-

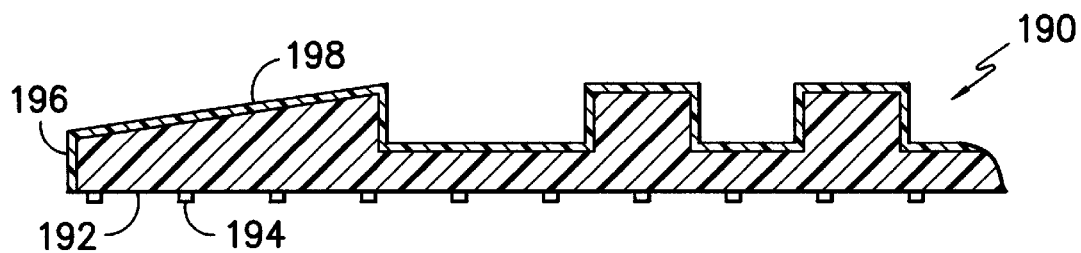
FIG. -19-
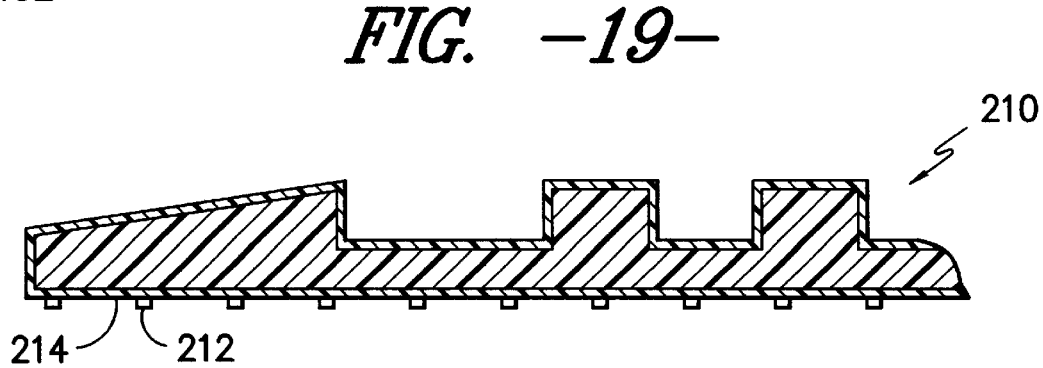
FIG. -20-
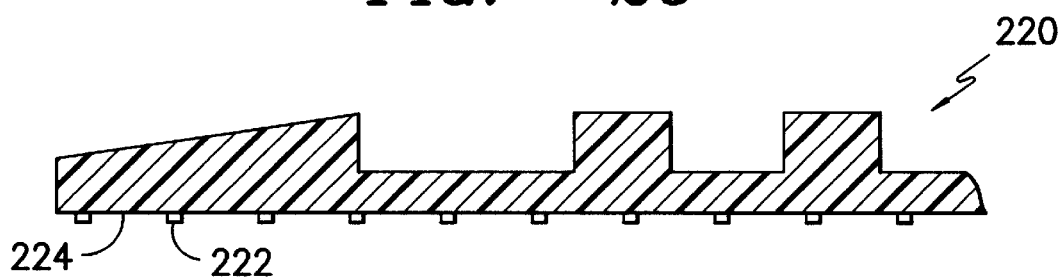
FIG. -21-
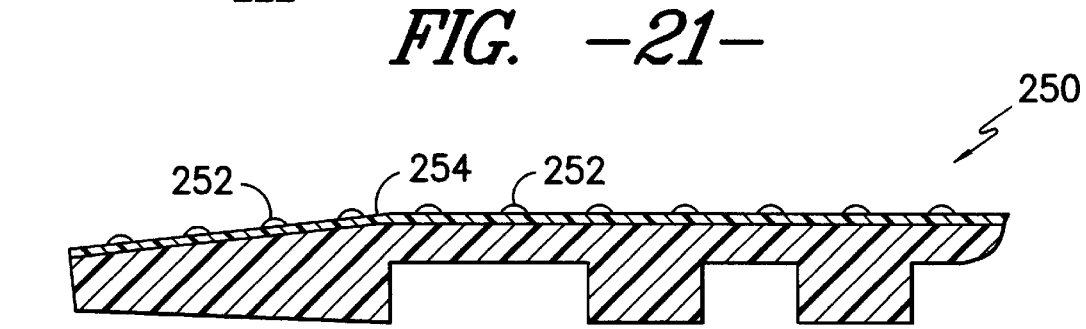
FIG. -22-
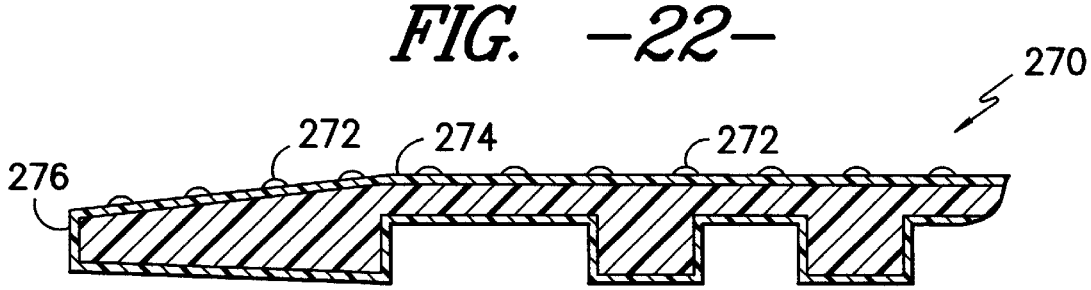
FIG. -23-

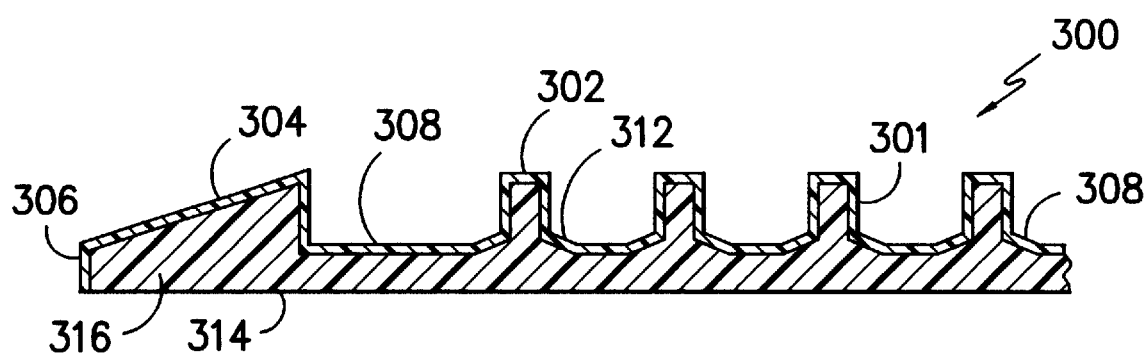
FIG. −24−
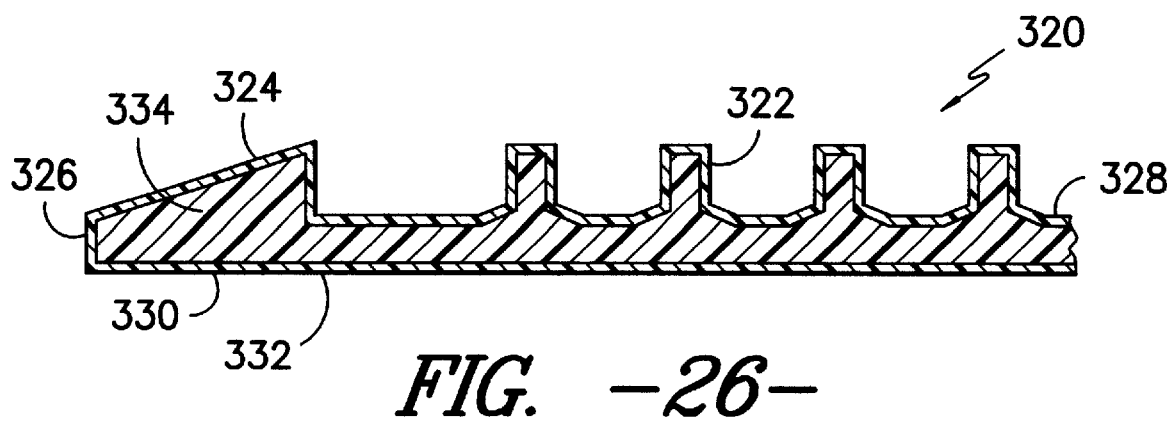
FIG. −26−
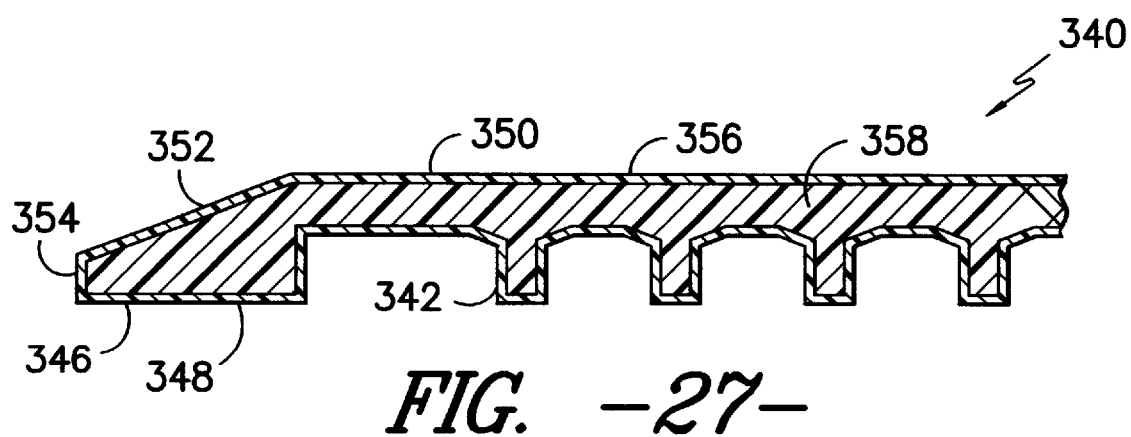
FIG. −27−

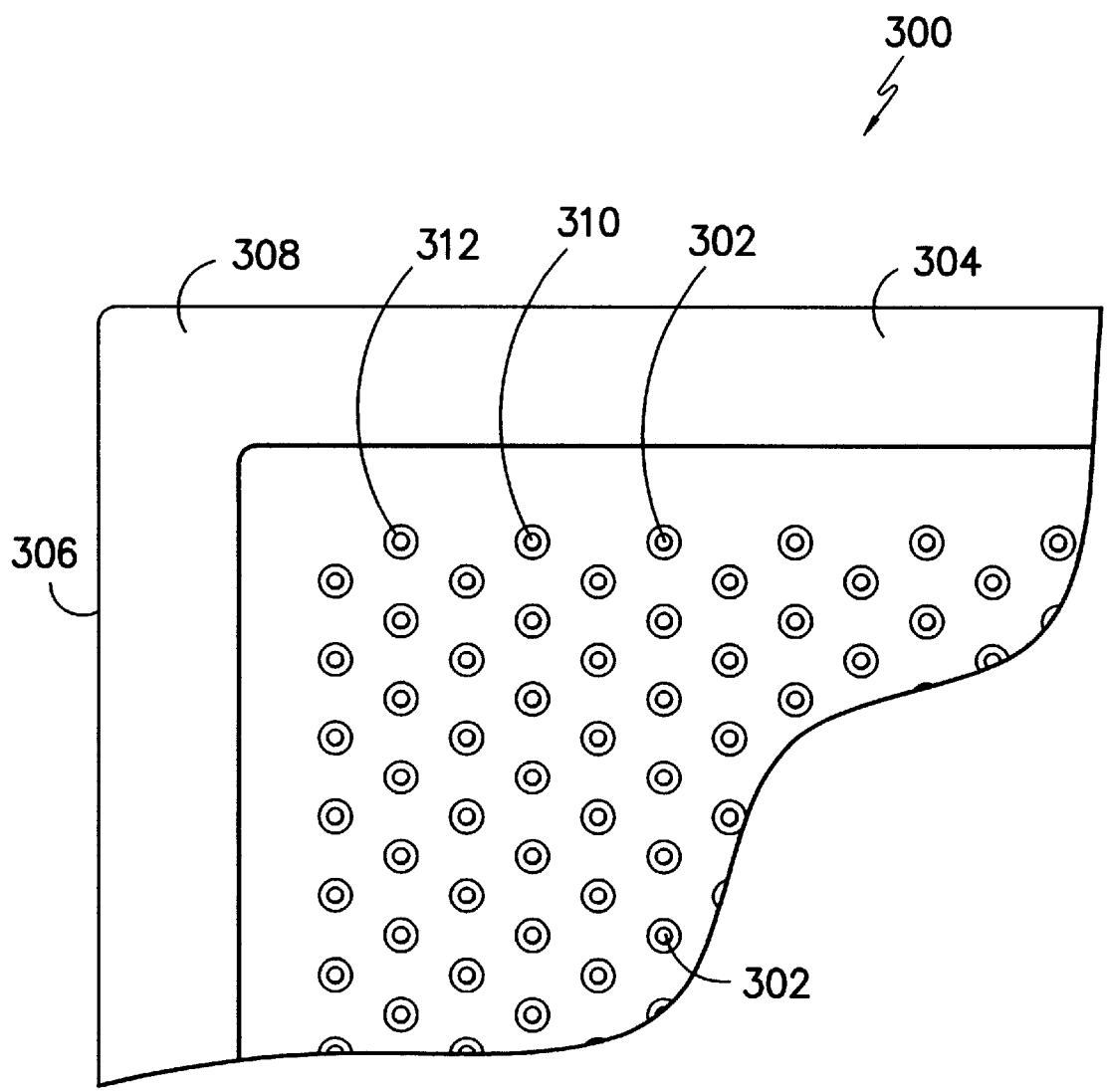
FIG. -25-

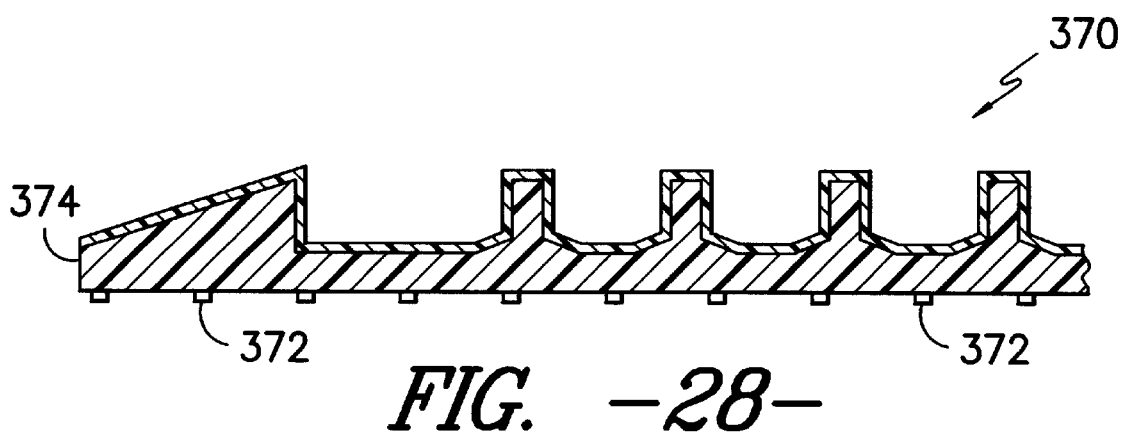
FIG. -28-
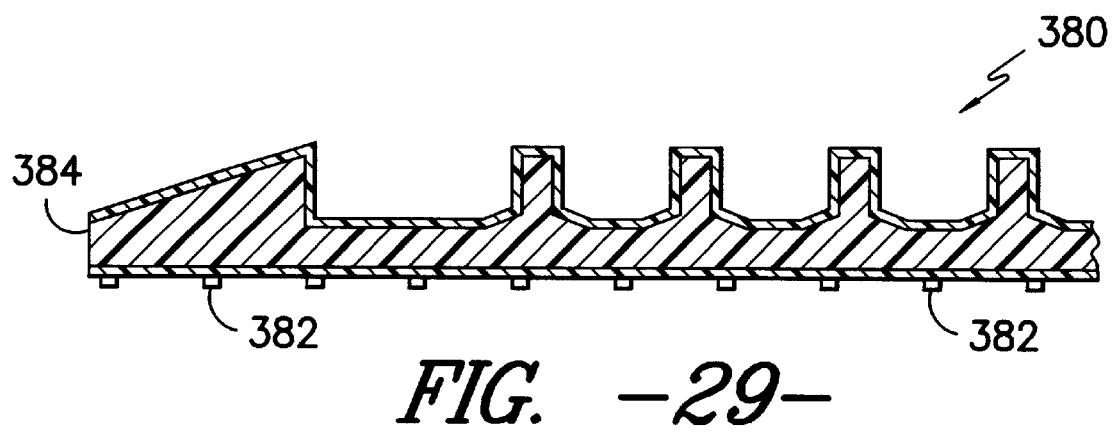
FIG. -29-
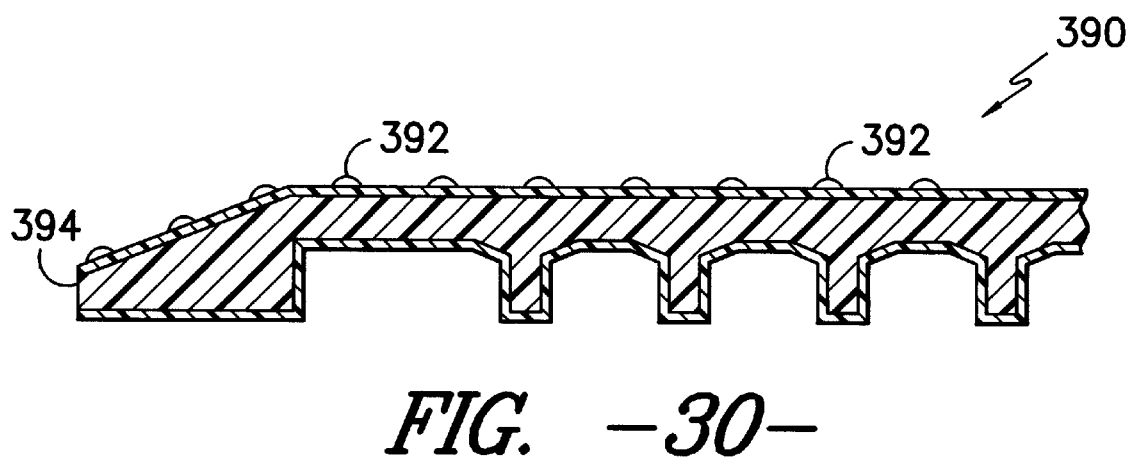
FIG. -30-

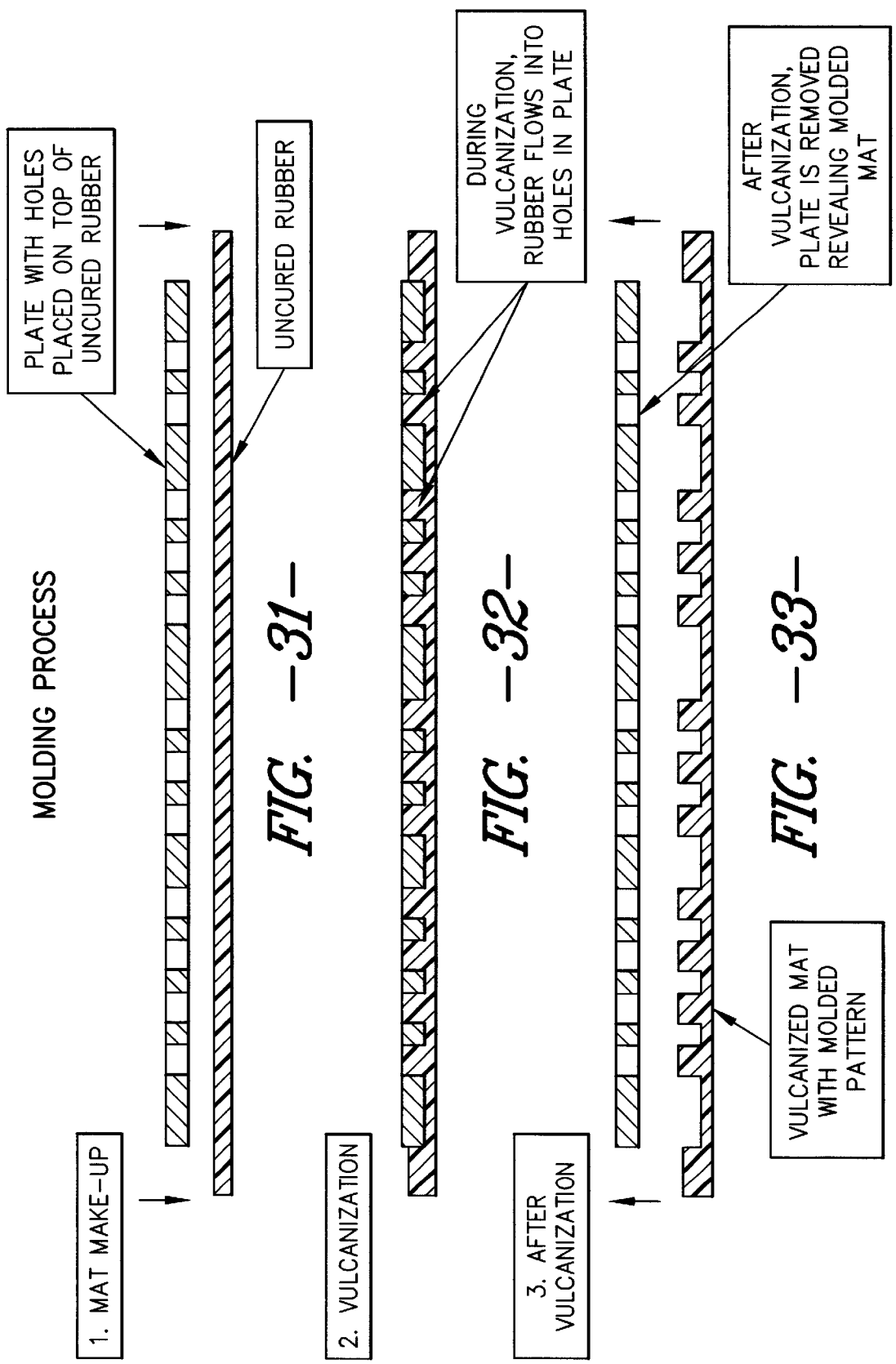

BACK OF THE MAT SURFACE DETAIL
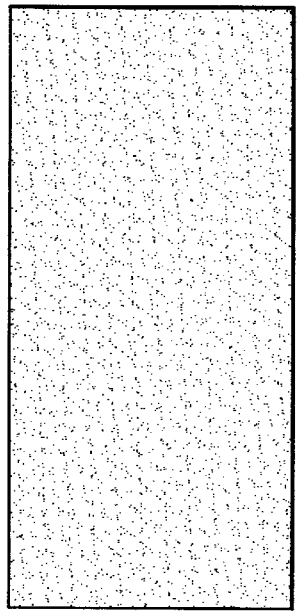
BACK OF MAT MAY HAVE SMOOTH TEXTURE
FIG. —34—
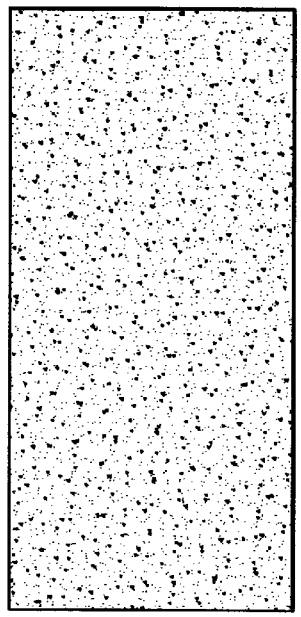
BACK OF MAT MAY HAVE ROUGH TEXTURE
FIG. —35—
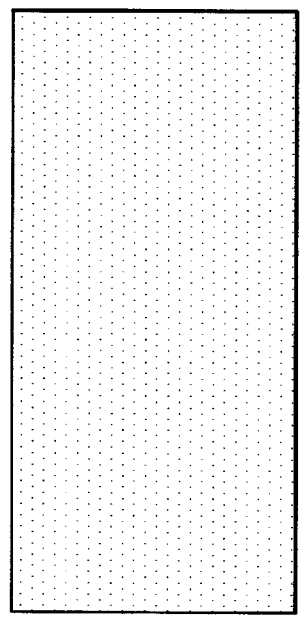
BACK OF MAT MAY HAVE GRIPPER TEXTURE OF SMALL RAISED NUBS OR SIMILAR VARIANT
FIG. —36—

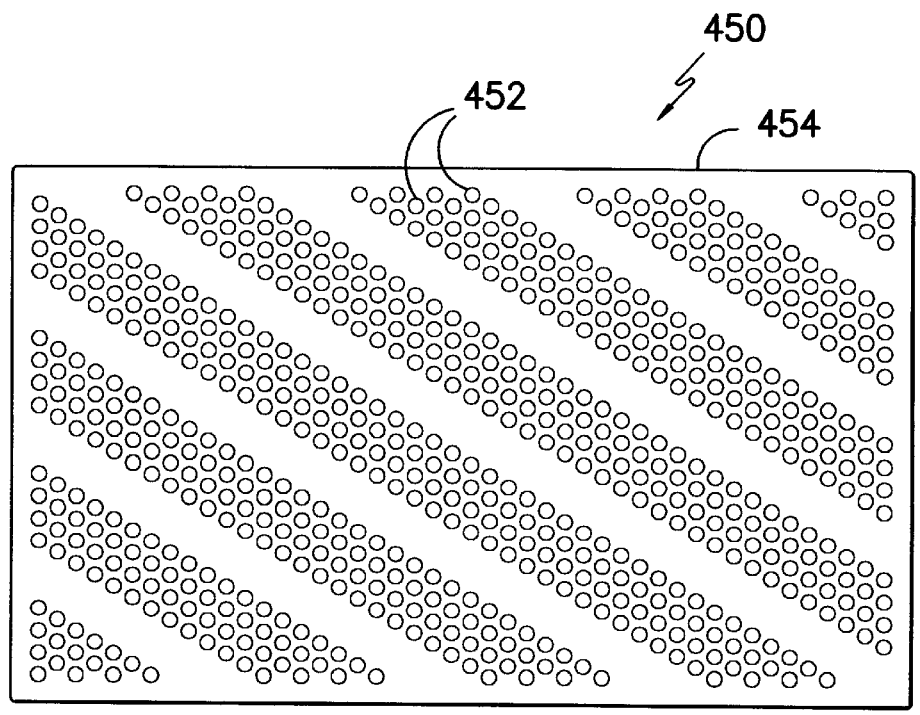
FIG. -37-
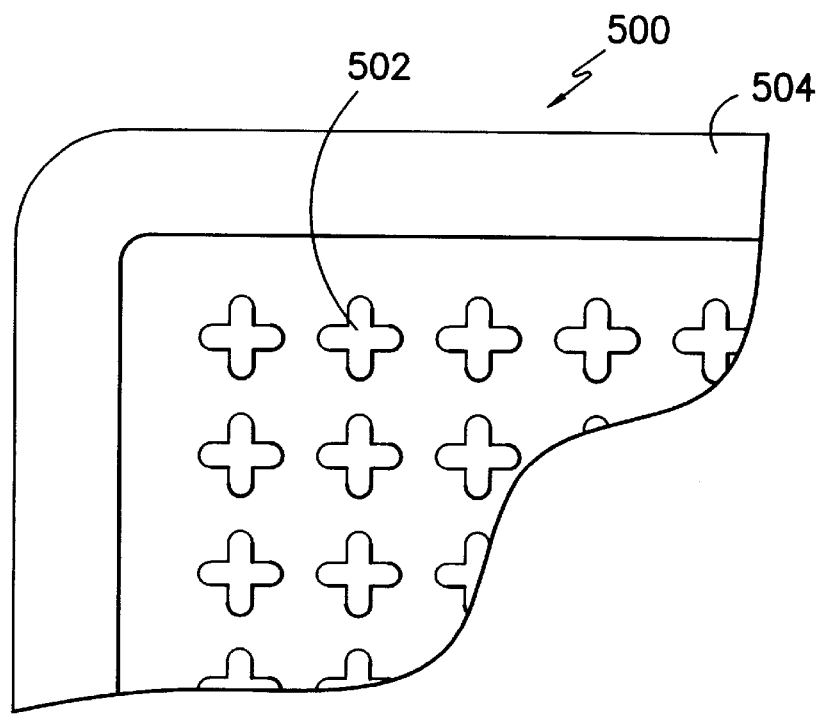
FIG. -38-

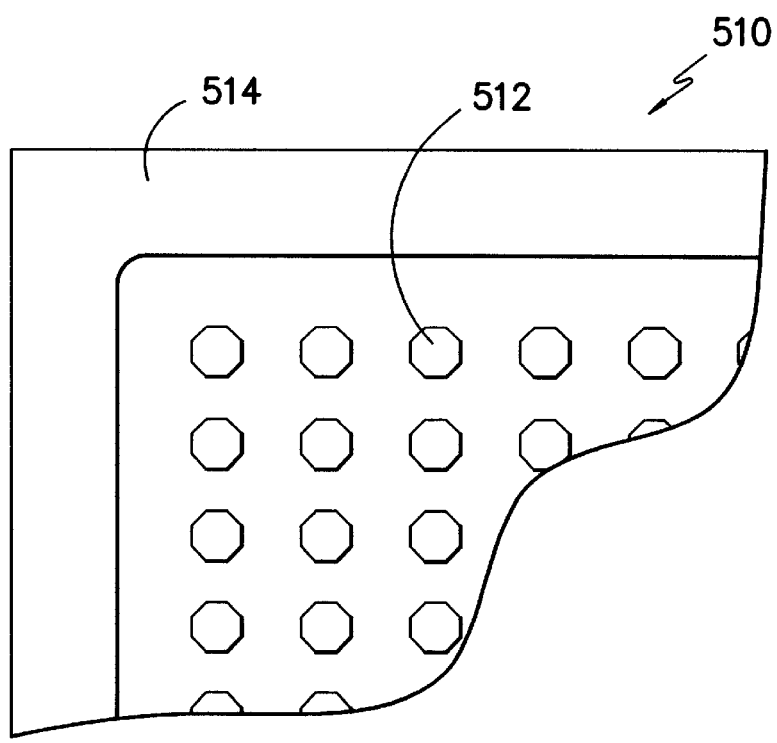
FIG. -39-
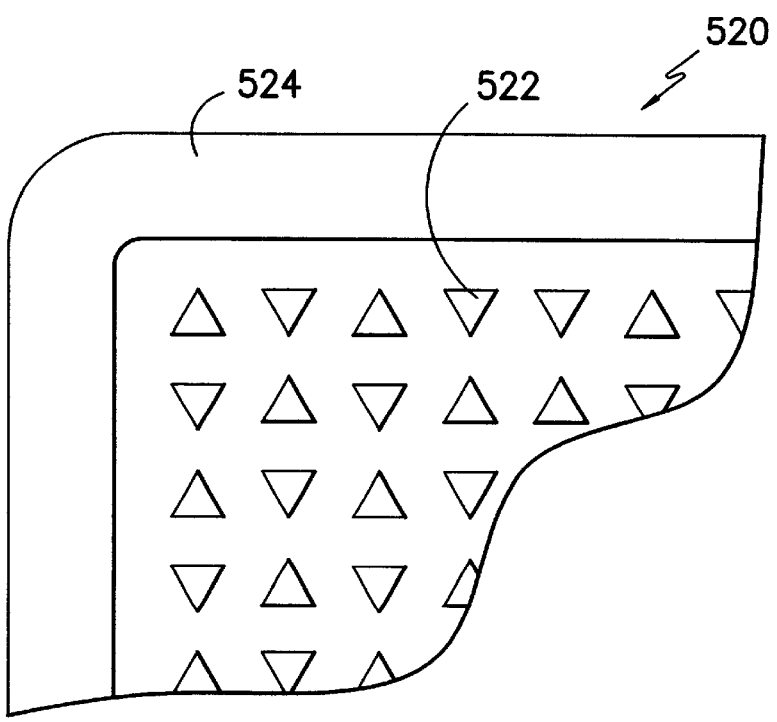
FIG. -40-

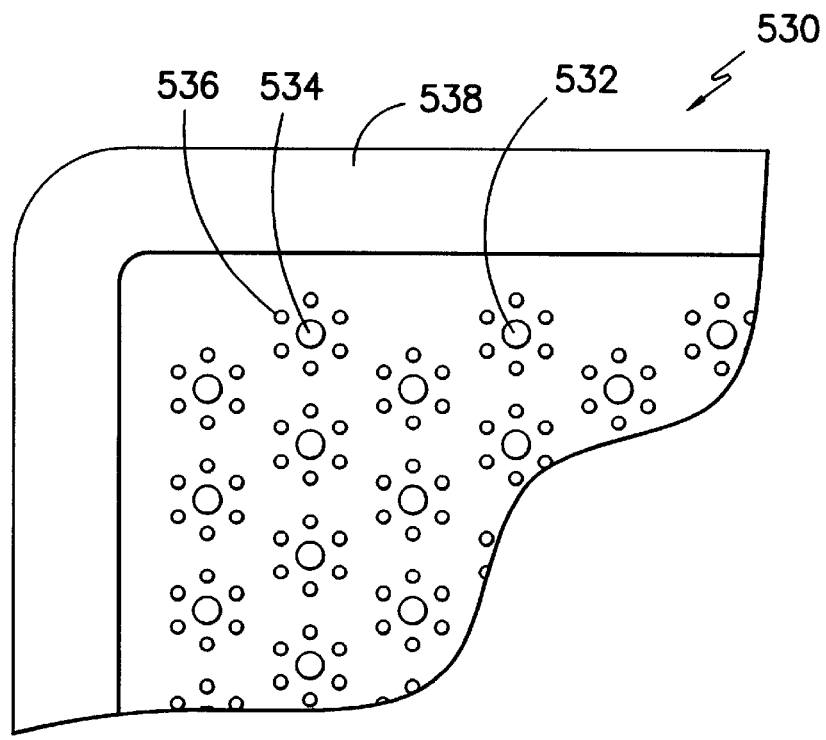
FIG. -41-
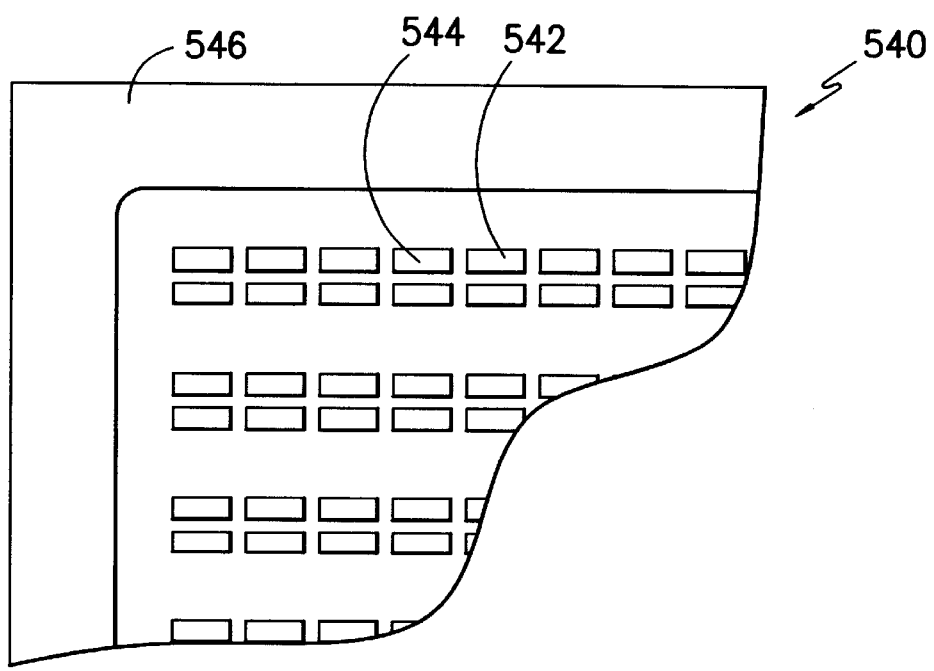
FIG. -42-

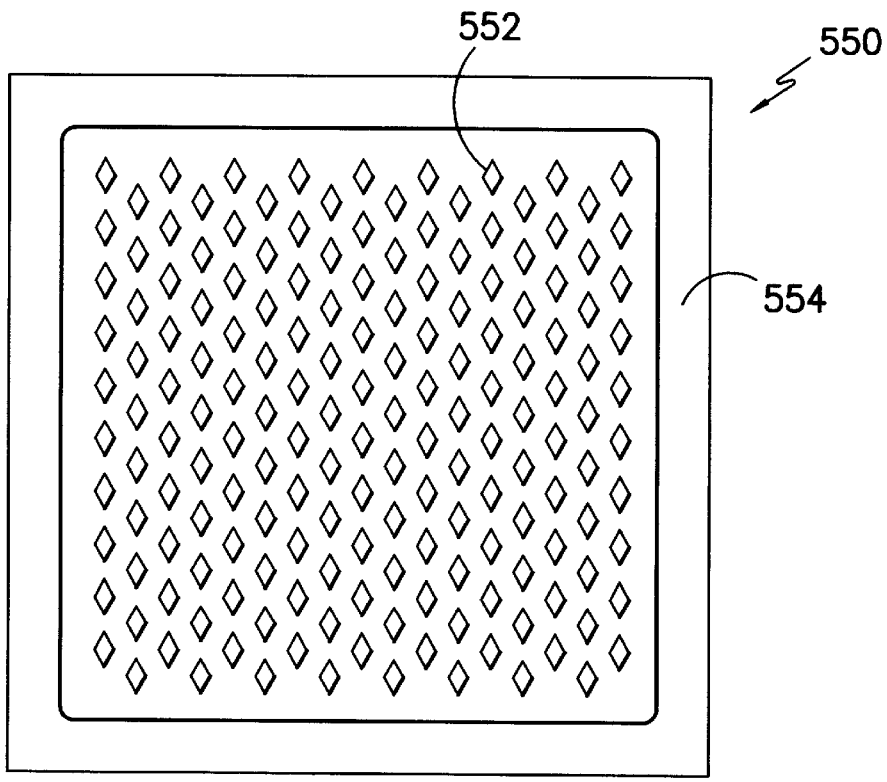
FIG. -43-
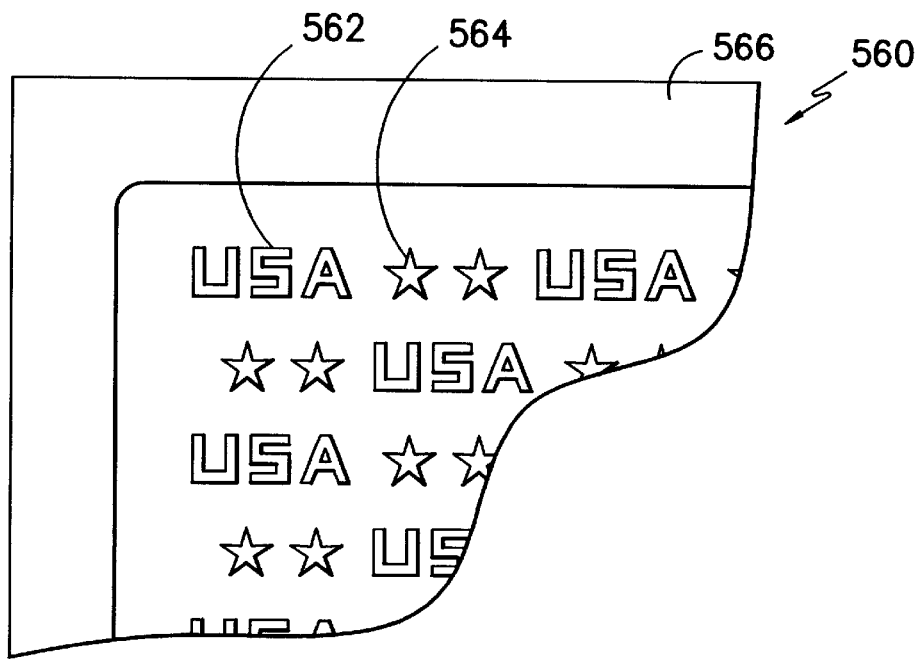
FIG. -44-

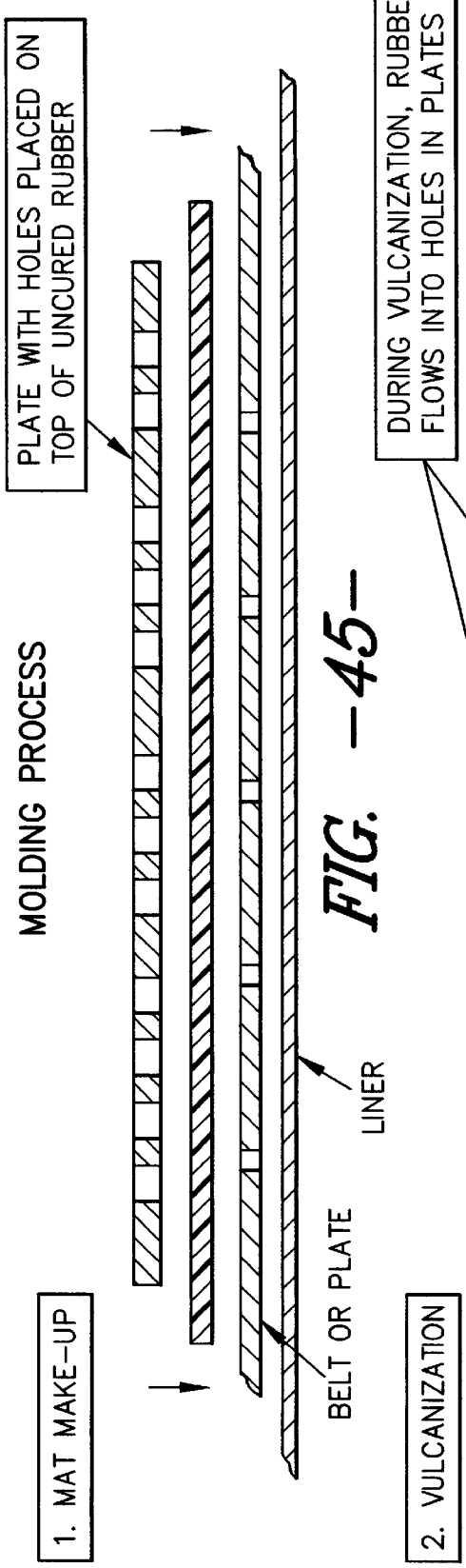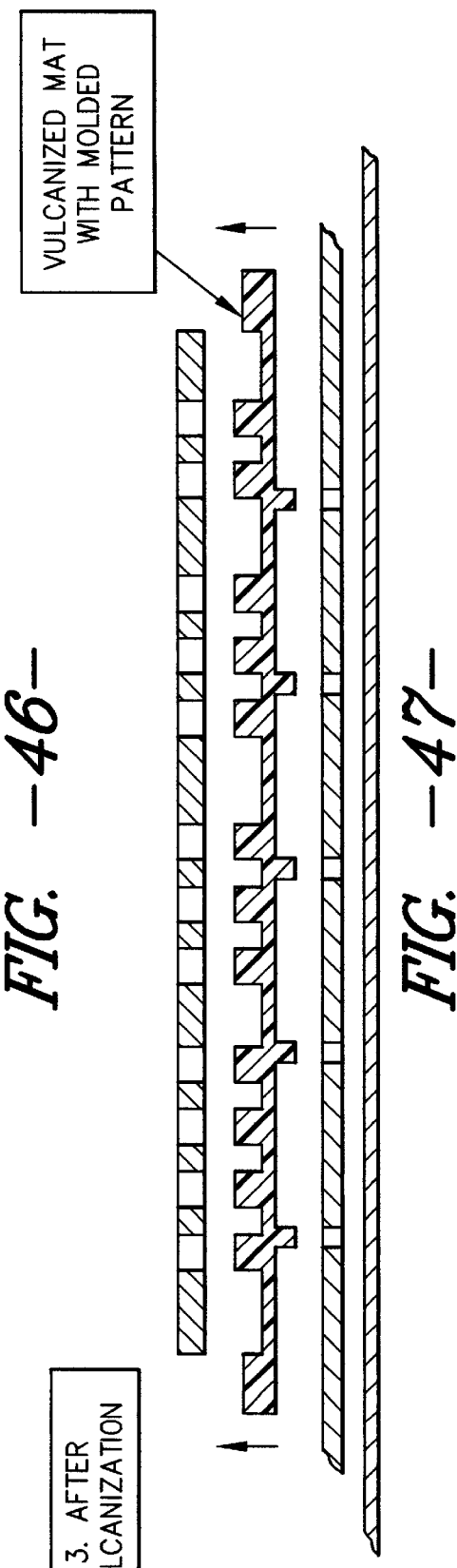

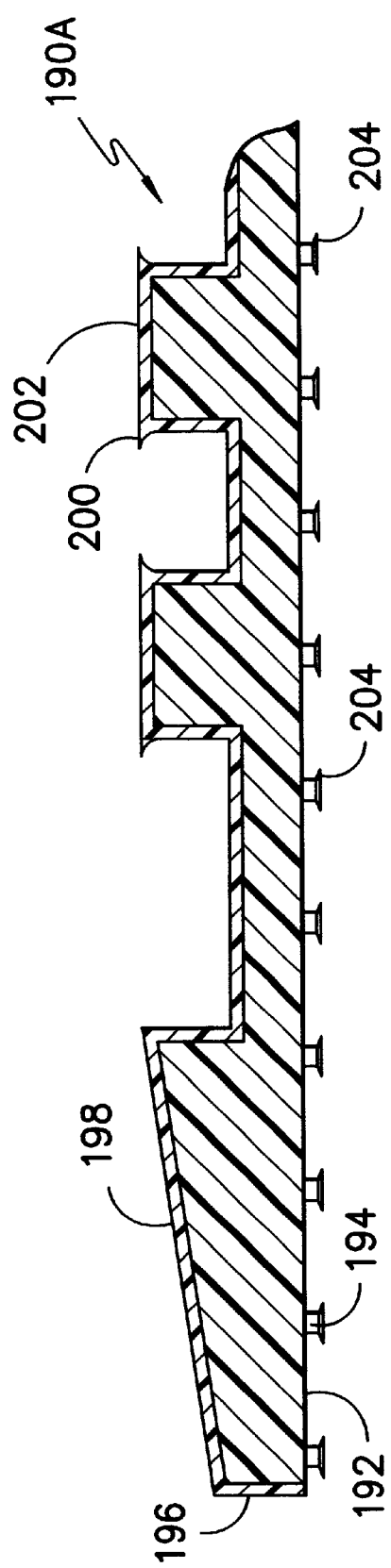
FIG. -48-

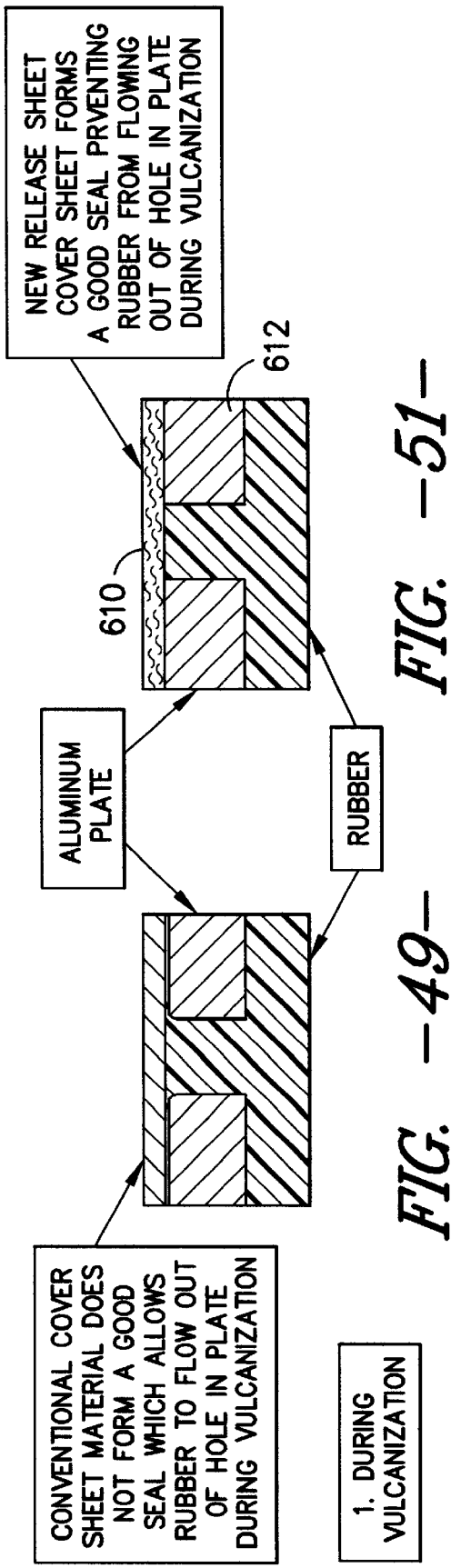

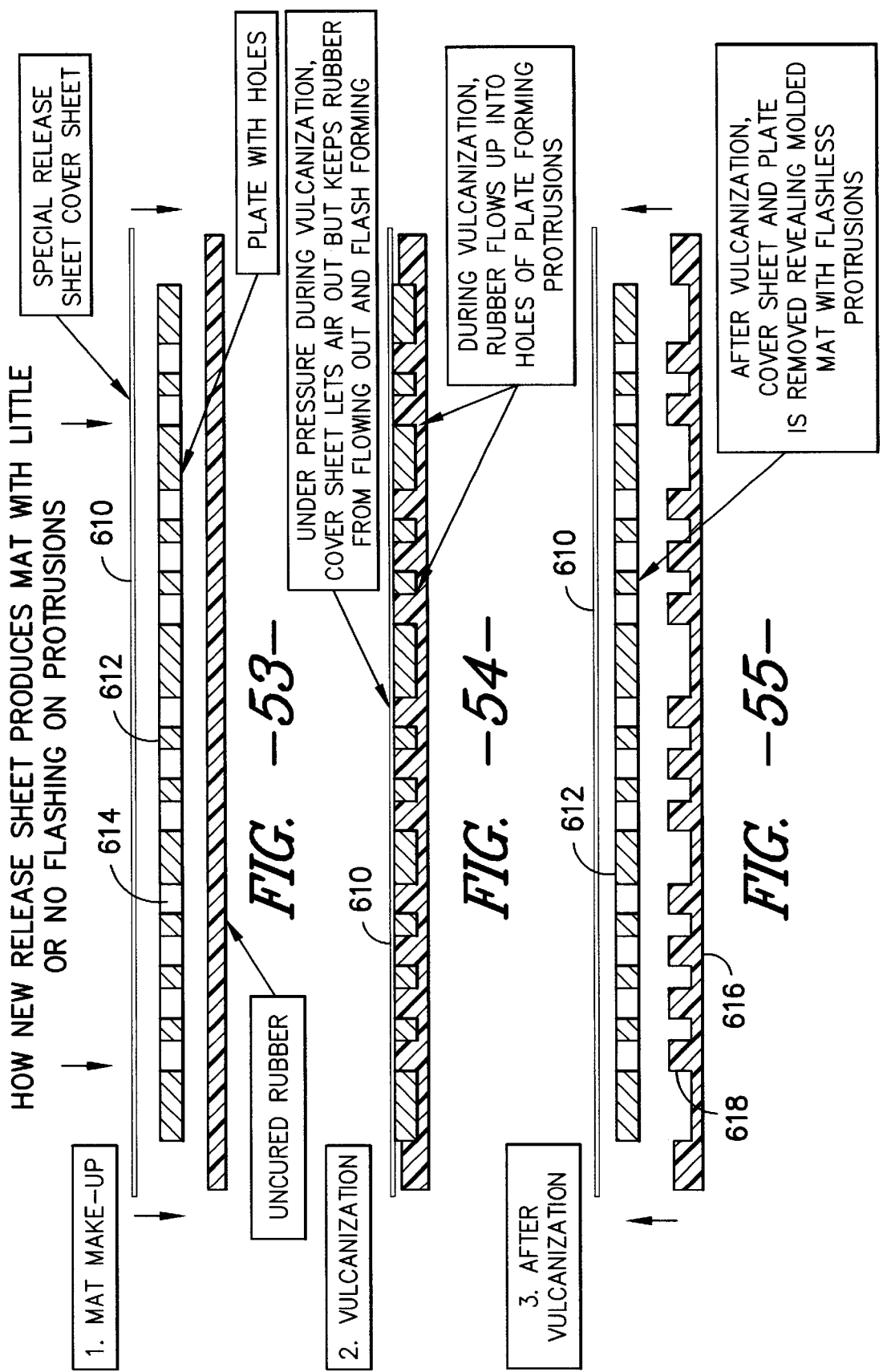

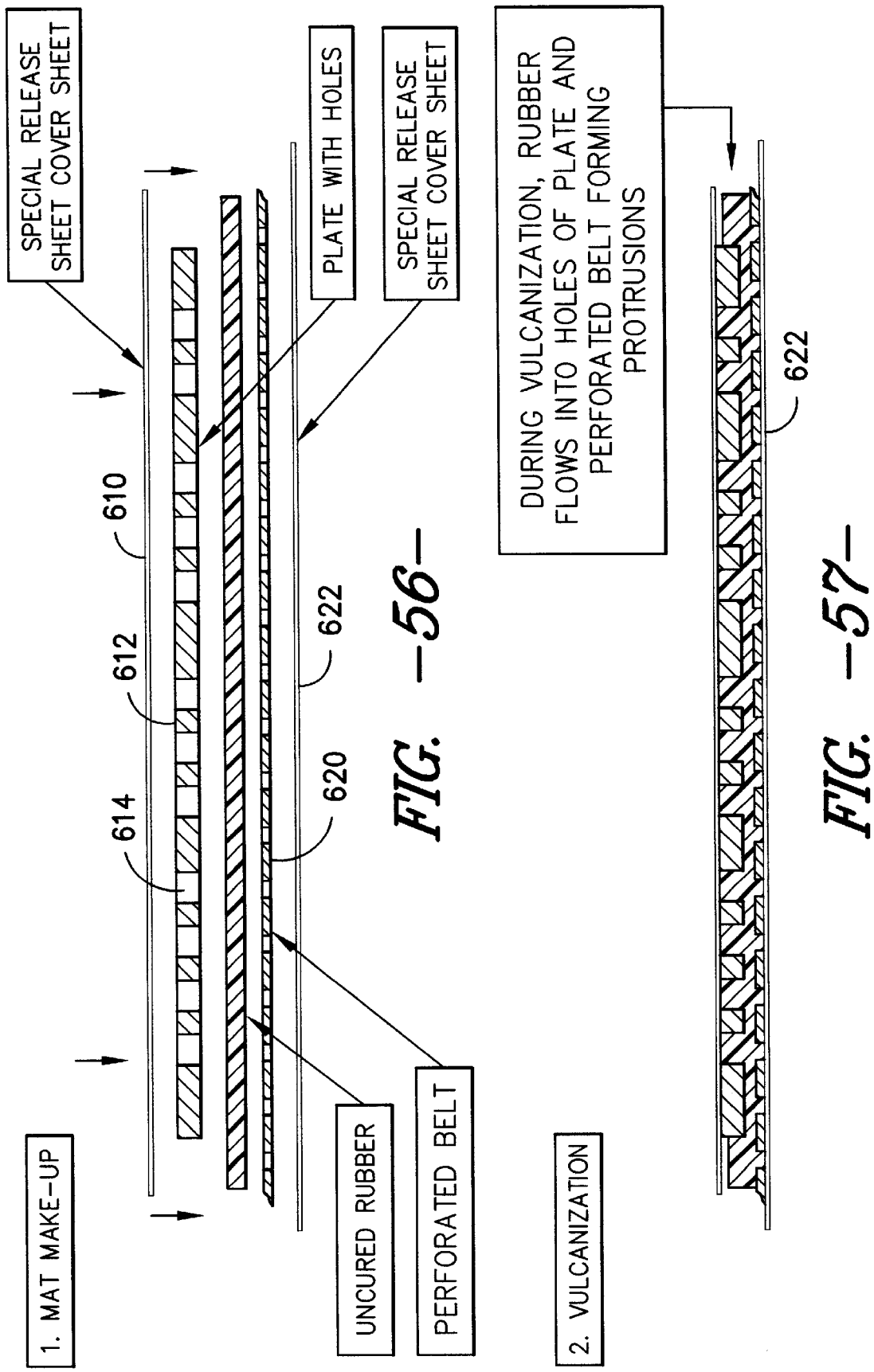

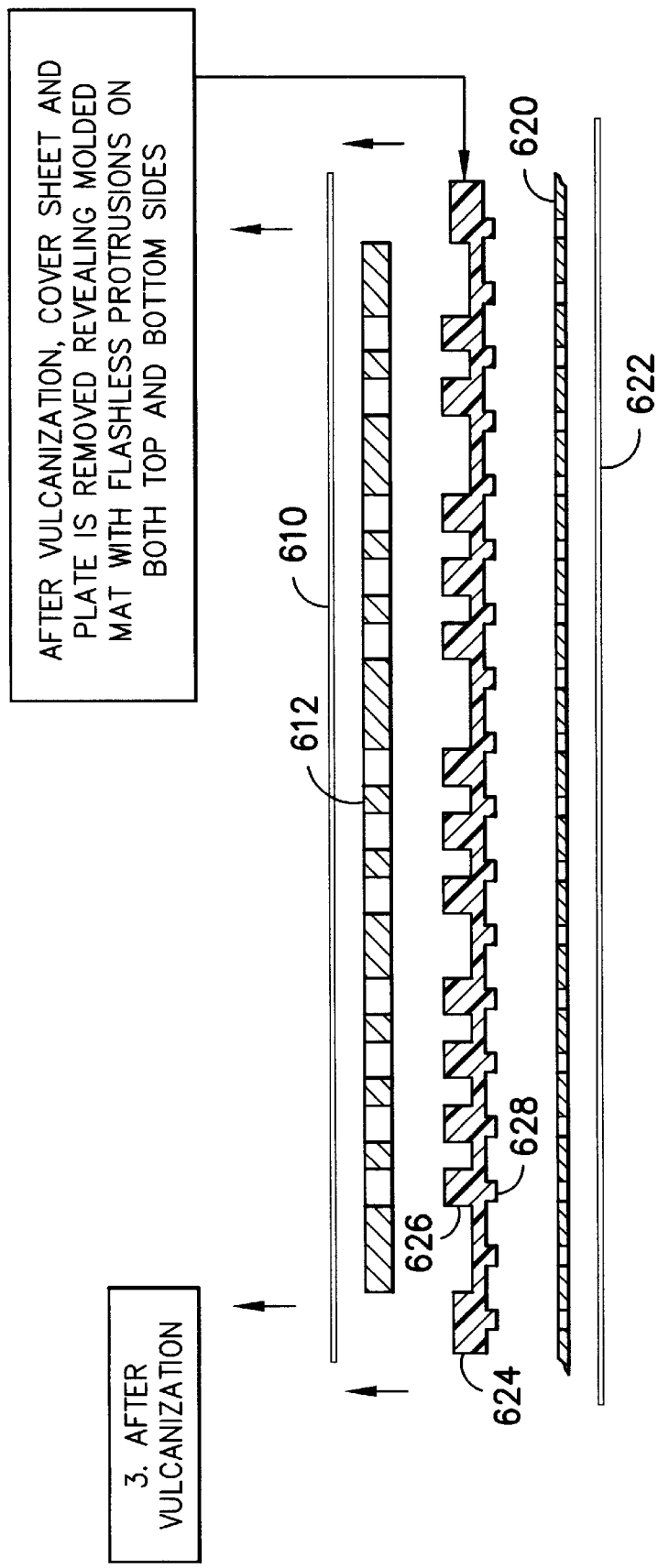
FIG. -58-

FLASHLESS RUBBER FLOOR MAT AND METHOD

FIELD OF THE INVENTION

This invention relates to a dust control mat article wherein the mat includes one or more layers of rubber. In one embodiment the mat includes at least two layers of rubber, one comprising foam rubber, the other comprising solid rubber. The solid rubber layer is present over the foam rubber layer. Also, at least one integrated rubber protrusion is present to provide cushioning characteristics. The solid rubber layer can act as a cap or barrier for the foam rubber layer, preferably over the integrated protrusion or protrusions. Such a mat is resilient, will not easily degrade in its modulus strength after appreciable use and/or washing within industrial cleaning processes, and will not exhibit appreciable cracking or breaking, particularly within the integrated protrusion(s), after standard use for pedestrian traffic. Methods of producing such inventive cushioned floor mats or articles are also provided. Also, methods of producing mats with flashless protrusions and/or cleats is also provided.

BACKGROUND OF THE INVENTION

All U.S. patents cited herein are hereby fully incorporated by reference.

As described in Ser. No. 09/374,707, now U.S. Pat. No. 6,340,514, floor mats have long been utilized to facilitate the cleaning of the bottoms of people's shoes, particularly in areas of high pedestrian traffic such as doorways. Moisture, dirt, and debris from out of doors easily adhere to such footwear, particularly in inclement weather and particularly in areas of grass or mud or the like. Such unwanted and potentially floor staining or dirtying articles need to be removed from a person's footwear prior to entry indoors. As will be appreciated, such mats by their nature must undergo frequent repeated washings and dryings so as to remove the dirt and debris deposited thereon during use. These mats are generally rented from service entities which retrieve the soiled mats from the user and provide clean replacement mats on a frequent basis. The soiled mats are thereafter cleaned and dried in an industrial laundering process (such as within rotary washing and drying machines, for example) or by hand and then sent to another user in replacement of newly soiled mats.

Uncarpeted anti-fatigue dust control mats have been made in the past comprised of dense rubber, scrap rubber, sponge-like material, including PVC, vinyl polymers, and polyurethanes, as well as recycled tire rubber. The mats are generally not able to be washed in industrial cleaning applications (such as rotary washing machines) since they are either too heavy or dense (and thus either damage the machine or themselves) or either deteriorate too easily (since sponge-like materials are easy to tear apart, particularly in rotary cleaning applications). Such washability is a key to providing a suitable floor mat article within the standard rental laundry market. As such, it has been very difficult to produce uncarpeted cushioned floor mats which exhibit sufficient strength to withstand vigorous cleaning and laundering associated with industrial rental laundry services. Foam rubber has only recently been utilized within dust control mats as a manner of reducing the overall mass of the mat article to facilitate movement and cleaning (such as in U.S. Pat. No. 5,305,565 to Nagahama et al.). Also, cushioned mats have been produced, generally including portions of the mat which contain discrete areas of integrated rubber increasing the surface area of the mat in three axes, which thereby provide cushioned areas on which a pedestrian may step. However, other than as described in Ser. No. 09/374,707, now U.S. Pat. No. 6,340,514 there have not been any mats comprising integrated rubber protrusions which not only permit repeated industrial washings without exhibiting appreciable degradation of the mat structure but also provide excellent cushioning effects to pedestrian users for more comfortable floor and ground covering as well as provide a surface to clean such pedestrians' footwear.

Further, certain cushioned and non-cushioned (solid) rubber floor mats have experienced problems with flashing, flaring, or hooks at the top edges of the protrusions, cleats, or the like (FIGS. 48–50) depending on the mat construction and manufacturing process. Flashing tends to be aesthetically displeasing. Also, flashing may deleteriously effect the functioning of the mat. Slight flashing tends to rub or come off of the mat following use of or washing of the mat. Although numerous attempts have been made to reduce or eliminate flashing on rubber floor mats, most such attempts have been unsuccessful at totally eliminating flashing or have proven too costly and/or complicated to implement. One successful approach to reducing flashing on cleats of a cleated mat is described in above-mentioned U.S. patent application Ser. No. 09/405,883, filed Sep. 24, 1999, now U.S. Pat. No. 6,303,068.

Hence, there is a need for an improved flashless mat or article and method of producing such a mat.

OBJECTS AND DESCRIPTION OF THE INVENTION

It is thus an object of this invention to provide a flashless or reduced flash floor mat and method. Further, it is an object to provide a flashless, durable, dust control mat which permits cleaning of a pedestrian's footwear. Furthermore, it is an object of the invention to provide a flashless, durable, cushioned dust control mat in which the cushioning aspects are provided by at least one integrated rubber protrusion produced during the necessary vulcanization process. Still other objects of the invention is to provide a flashless cushioned all-rubber floor mat which retains its cushioning characteristics and shape upon use and can be laundered repeatedly within industrial rotary washing machines without damaging such machines or themselves.

Accordingly, one embodiment of this invention encompasses a rubber floor mat structure comprising at least two separate layers of rubber wherein said at least two layers comprise a first layer comprised of foam rubber; and a second layer comprised of solid rubber;

wherein at least one protrusion integrated within said rubber mat structure is present having a core portion and an outside surface portion, wherein the core portion of said at least one protrusion is comprised of said first layer of foam rubber, wherein the outside surface portion of said at least one protrusion is comprised of said second layer of solid rubber, and wherein said at least one protrusion is substantially flashless.

The first rubber layer may be comprised of any standard rubber composition, including, but not limited to, acrylonitrile-butadiene rubber (NBR), styrene-butadiene rubber (SBR), carboxylated NBRB, carboxylated SBR, chlorinated rubber, silicon-containing rubber, and the like, all of which must include a blowing agent to form the necessary closed-cell structure of the resultant foam rubber, such as in U.S. Pat. No. 5,305,565 to Nagahama et al. For cost purposes, the preferred rubbers are NBR, SBR, and blends thereof.

As noted above, the foam rubber component is of utmost necessity in a cushioned floor mat. Dust control mats have exhibited general problems arising from frequent washings and harsh environments of use. First, the energy required to wash and dry a typical floor mat is significant due to the overall mass of the mats. The overall mass is most significantly attributed to the mass of the rubber within the mat. As will be appreciated, a reduction in the overall mass of the floor mat will result in a reduced energy requirement in washing and drying the mat. Moreover, a relative reduction in the mass of the rubber will provide the most substantial benefit. Thus, the utilization of a lighter weight rubber composition, such as foam rubber, in at least a portion of the dust control mat of the present invention includes a rubber backing sheet which may possess a specific gravity which is approximately 25 to, 35 percent less then the rubber sheets of typical prior floor mats. Accordingly, in at least one embodiment, a foam rubber is used as the bottom layer of the mat and the core layer of the integrated rubber protrusion(s) of this invention. Such a foam rubber layer is present as a thicker layer than the solid rubber cap (generally). The target thickness for such a first layer is from about 5 to about 500 mils, preferably from about 25 to about 400 mils, more preferably from about 40 to about 350 mils, and most preferably from about 75 to about 250 mils.

The resultant lighter weight of the mat structure thus translates into a reduced possibility of the mat harming either the washing or drying machine in which the mat is cleaned, or the mat being harmed itself during such rigorous procedures. Although the inventive floor mat must withstand the rigors of industrial machine washing, hand washing and any other manner of cleaning may also be utilized. Foam rubber also permits the retention or return to the original shape of the mat after continuous pedestrian use. Overall, the inventive floor mat provides an article which will retain its aesthetically pleasing characteristics over a long period of time and which thereby translates into reduced costs for the consumer.

In accordance with at least one embodiment, at least a second rubber layer comprises a solid rubber composition. Such a solid rubber may be comprised of any standard type of rubber, such as acrylonitrile-butadiene (NBR) or styrene-butadiene (SBR), or carboxylated derivatives of such butadienes, EPDM, and the like (i.e., those noted above but without the addition of a blowing agent), all merely as examples. Preferably, the second layer is comprised of NBR. The target thickness for such a second layer is from about 2 to about 50 mils, preferably from about 4 to about 40 mils, more preferably from about 5 to about 35 mils, and most preferably from about 10 to about 25 mils. This layer is preferably placed on at least the top of the foam rubber first layer as to cover the entire first layer prior to vulcanization. However, this second layer may also merely cover a portion of the first layer, if desired. Once the second layer is placed directly on top of the first layer, a die mold, plate, belt, or the like, is then placed on top of the second layer which comprises openings through which molten rubber may flow during vulcanization and pressing of the structure. The high pressures (about 15 to about 50 psi, preferably 20 to 40 psi) and temperatures (about 250 to about 400° F., preferably from about 320 to about 385° F.) associated with vulcanization thus melt and force a certain amount of the two layers through the die mold or plate openings. The denser solid rubber does not permit the less dense blown foam rubber to protrude through the solid rubber layer during this procedure. As such, the resultant protrusions preferably possess foam rubber cores and solid rubber caps. Such protrusions add to the overall surface of the top (or bottom) of the mat structure, thus the solid rubber layer is appreciably thinner after vulcanization and molding than after the initial placement step. However, the solid rubber layer still remains intact and possesses sufficient strength to protect the foam rubber from contact with pedestrians' footwear, atmospheric conditions, and sunlight. The resultant mat thus is intended to be used with the capped protrusions facing toward the pedestrian. However, a die mold, plate, belt, or the like, may also be placed beneath the unvulcanized structure such that protrusions or cleats may be formed on both sides (with or without a solid rubber layer capping such foam rubber protrusions), as desired. The inventive mat includes one or more layers, and preferably possess at least a two-layer structure with accompanying protrusions therein.

Furthermore, a problem exists within this field concerning the deterioration of the carbon-carbon double bonds in the matrix of the rubber backing sheet due to the exposure of the sheets to an oxidizing environment during use and cleaning. Specifically, the exposure of the mats to oxidizing agents during the washing and drying process tends to cleave the carbon-carbon double bonds of the rubber sheet thereby substantially embrittling the rubber which leads to cracking under the stress of use. In addition to the laundering process, the exposure of the mats to oxygen and ozone, either atmospheric or generated, during storage and use leads to cracking over time. The mat of the present invention may thus include an ozone-resistance additive, such as ethylene-propylene-diene monomer rubber (EPDM), as taught within U.S. Pat. No. 5,902,662, to Kerr, which provides enhanced protection to the rubber backing sheet against oxygen in order to substantially prolong the useful life of the mat. Such an additive also appears to provide a reduction in staining ability of such rubber backed mats upon contact with various surfaces, such as concrete, wood, and a handler's skin, just to, name a few, as discussed in U.S. patent application Ser. No. 09/113,842, now U.S. Pat. No. 6,159,576 to Rockwell, Jr.

The term "integrated rubber protrusion" is intended to encompass any type of protrusion from the rubber mat (top and/or bottom) which is formed from the same rubber compositions of the foam rubber layer, solid rubber layer, or two or more separate layers of rubber and is not attached in any manner to the resultant backing sheet after vulcanization. Thus, such a protrusion would be produced through the melting of the rubber composition during vulcanization and allowing molten rubber to flow into or through a die mold, plate, or belt in a position in which it remains until it cures and sets. The shape of such a protrusion is virtually limitless, and may be of any size. As noted above, the majority of the mat structure (the first layer) is preferably a rubber including a blowing agent (to produce a foam rubber) and at least a second layer of solid rubber covers this foam rubber portion. In such a manner, the protrusions on at least one side of the mat are formed with a core of foam rubber and a cap of solid rubber upon vulcanization through a die-mold. The separate protrusions thus provide discrete areas of relaxed stress within the inventive mat (particularly with the core of softer foam rubber) which provides a cushioning effect to a pedestrian, greater than for an overall flat foam rubber structure.

With regard to the protrusion forming die mold, plate, belt, pad, or the like, it may be constructed of any material which can withstand vulcanization temperatures (i.e., between about 250° F. and about 400° F.) and pressures (i.e., between about 15 psi and 50 psi, generally). Thus, any metal may be utilized, such as steel, aluminum, titanium, and the like, certain plastics, such as Teflon®, for example, silicon molds, and the like.

Also, as described in U.S. patent application Ser. No. 09/405,883, filed Sep. 24, 1999, now U.S. Pat. No. 6,303,068 hereby incorporated by reference, different belting materials may be used such as fiberglass coated with Teflon®. Preferably, the die mold or plate is made of steel or aluminum, is generally square or rectangular in shape (although any shape may be utilized), may have rounded corners, and comprises holes throughout to ultimately form the desired protrusions. Such holes may be any shape, such as circular, polygonal, oval, elliptical, lobed, or the like, and preferably, such holes are substantially circular or rounded in shape (at the die surface) and cylindrical as well (i.e., circular on both surfaces with the same shape throughout the die from one surface to the other). Furthermore, such a die may also be utilized in an in-line process wherein there is no need to hand place the backing sheet over the die itself. Also, a die, plate, belt, pad, or the like may be placed below the rubber to be vulcanized to form protrusions or cleats on the top and/or bottom of the mat. The preferred procedure is outlined more particularly below.

The inventive mat provides a long-lasting, industrially washable, cushioned rubber floor mat which provides comfort to users as well as significantly increased duration of utility and continuity of aesthetic and modulus strength characteristics. All of this translates into reduced cost for the consumer as costs to produce are lower, the need to replace such mats is greatly reduced over other anti-fatigue, cushioned mat products, and possible medical and insurance costs may also be reduced with the utilization of such specific cushioned mats which also work to remove dirt and moisture from pedestrians' footwear.

In accordance with one embodiment of the invention, any flashing problems on the surface of the protrusions and/or cleats of the mat are improved, reduced, or eliminated.

In accordance with one example of reducing or eliminating flashing on the mat, a new manufacturing process was developed. As before, holes cut into the plate can be round, square, other polygons, or any other variant. The surface pattern is molded into the mat during vulcanization by using a plate in which the pattern is cut. In the mat make-up process, the plate is placed on top of the uncured rubber and a special release sheet, material or liner is placed over the plate. The special material allows air to escape during formation of the protrusion, but limits the flow of rubber or other mat material so that it does not flow past the point of where the intended protrusion was to form. In other words, the resulting protrusions have the dimensions very close to that of which was intended and have very little excess material present. When the rubber is vulcanized, the rubber flows up into the holes in the plate to create the pattern. After vulcanization the liner and plate are removed.

In accordance with an example of improving the non-slip or anti-creep characteristics of the mat, the back of the mat may either have a rough texture surface, a smooth surface, or a gripper pattern depending on the environment in which the mat is to be used.

One purpose of the invention is to create an improved version of the washable anti-fatigue mat of foam rubber with/without a dense rubber cap that has improved non-slip, anti-creep, anti-skid, anti-microbial, and/or other characteristics. The added or improved characteristics of the invention will give it an advantage over other products because it can be used in wet or slick environments where mat slippage is a concern.

One aspect of the present invention relates to specific methods of producing cleated rubber-backed floor mats (such as dust control or rubber mats) through the utilization of the combination of a perforated coated woven fabric article or belt and a special release sheet material or liner between the fabric article and the metal platen of an in-line dust control mat manufacturing machine. Such a procedure permits an efficient manner of producing substantially flashless cleated anti-creep (anti-skid) dust control mats. In one embodiment, the fabric article is in the form of a conveyor belt and is preferably constructed from Teflon®-coated or PTFE-coated woven fiberglass which will not adhere to the tacky rubber component of the target mat and can withstand the extremely high vulcanization temperatures and pressures required during the production of a dust control mat. The platen liner, which is preferably comprised of or coated with Teflon® or silicon, is utilized as a separator between the metal platen of the manufacturing machine, as well as a cushion for the molten rubber as it is pressed through the belt perforations during vulcanization. Such a special liner material substantially eliminates any flashing problems by blocking passage of the molten rubber as it passes through the article perforations. The produced mat as well as the woven fabric article and platen liner combination are also encompassed within this invention.

Floor mats have long been utilized to facilitate the cleaning of the bottoms of people's shoes, particularly in areas of high pedestrian traffic such as doorways. Moisture, dirt, and debris from out of doors easily adhere to such footwear, particularly in inclement weather and particularly in areas of grass or mud or the like. Such unwanted and potentially floor staining or dirtying articles need to be removed from a person's footwear prior to entry indoors. As will be appreciated, such outdoor mats by their nature must undergo frequent repeated washings and dryings so as to remove the dirt and debris deposited thereon during use. These mats are generally rented from service entities which retrieve the soiled mats from the user and provide clean replacement mats on a frequent basis. The soiled mats are thereafter cleaned and dried in an industrial laundering process (such as within rotary washing and drying machines, for example) and then sent to another user in replacement of newly soiled mats. Furthermore, it is generally necessary from a health standpoint to produce floor coverings on which persons may stand for appreciable amounts of time which will provide comfort to such persons to substantially lower the potential for fatigue of such persons by reducing the stress on feet and leg joints through cushioning.

Typical carpeted dust control mats comprise solid and/or foam rubber backing sheets which must be cleated in some manner to prevent slippage of the mat from its designated area. Such cleats are formed during a vulcanization step and have required a time-consuming procedure of placing the green (unvulcanized) rubber sheet on a molded, perforated silicon pad or perforated metal plate which is itself placed by hand on the conveyor belt of a dust control manufacturing apparatus. The finished mat is then removed after vulcanization from the non-stick silicon pad. The resultant mat product possesses cleats formed through the melting and forcing of part of the rubber backing through the pad perforations during vulcanization. Such cleats provide anti-slip or anti-creep characteristics to the finished mat when placed upon a surface to be protected. Various types, shapes, and arrangements of cleats have been utilized in the past with dust control mats. Examples include U.S. Pat. No. 4,741,065 to Parkins, U.S. Pat. No. 5,170,526 to Murray, and U.S. Pat. No. 5,227,214 to Kerr et al.

As noted above, previous methods of providing such cleat features to rubber-backed mats are generally produced through the utilization of a perforated silicon pad which is placed by hand on a conveyor belt in an in-line vulcanization apparatus. A rubber article is then placed on top of the silicon pad, and optionally a fabric pile (such as a carpet) is then placed, again by hand, on top the rubber article. The conveyer belt then transports the entire composite to a vulcanization chamber wherein it is pressed at a pressure of from about 25 to about 40 psi at a temperature of from about 300 to about 400° F. for anywhere between about 30 seconds and 20 minutes. After vulcanization, the conveyor belt transports the finished composite (floor mat plus silicon pad) out of the chamber. The floor mat is then removed from the pad and allowed to cool and the pad is moved, by hand, back to a location on the conveyor belt, prior to the chamber, in order for another rubber article to be placed thereon. Such a procedure is labor-intensive and inefficient.

In view of the foregoing, it is one object of the present invention to provide an in-line method for the production of cleats and/or protrusions in a rubber or rubber-backed floor mat. Furthermore, it is an object of this invention to provide a novel conveyor belt system for an in-line floor mat manufacturing apparatus. Additionally, an object of this invention is to provide a cleated anti-creep floor mat which is more easily and efficiently produced than standard cleated floor mats. Still another object of this invention is to provide an anti-creep floor mat which exhibits not only cleats to provide anti-slip characteristics, but also intermittent patterned areas within the rubber on the underside of the rubber floor mat component which mirrors the woven structure of the perforated fabric article or belt.

Accordingly, this invention encompasses a method of producing a substantially flashless cleated anti-creep floor mat comprising a rubber mat component with a mat producing apparatus comprising the steps of:

(a) providing a perforated woven fabric article, which is coated or comprised of a material which will not adhere to said rubber mat component after a vulcanization step, wherein said perforated woven fabric article is optionally separated from the metal platen of said apparatus by a platen liner;

(b) placing said rubber mat component on top of said perforated woven fabric article of step "a" and optionally placing thereon a fabric pile, a die mold, or a die mold followed by a release sheet;

(c) transporting the rubber mat component/perforated woven fabric article composite to a vulcanization chamber; and (d) vulcanizing said rubber mat component as it remains on top of the perforated woven fabric article, thereby forming cleats through the perforations of said perforated woven fabric article;

wherein said woven fabric article, platen liner and release sheet are comprised of or coated with materials which can withstand the temperatures and pressures associated with vulcanization.

Also, this invention concerns a floor mat manufacturing apparatus having a metal platen wherein said apparatus further comprises a perforated conveyor belt positioned on top of a cushioned platen liner which is positioned on top of said metal platen.

Additionally, this invention encompasses a floor mat article comprising at least a rubber sheet component wherein said rubber comprises a plurality of substantially flashless cleats formed integrally on the surface and at least a portion of the surface of said rubber sheet also comprises a weave pattern of molded rubber.

The term "perforated" or "perforations" is intended to encompass any configuration of holes or openings within the woven fabric article structure through or into which molten rubber may be forced during vulcanization. Thus, any shape hole, any orientation of holes, and any depth of such holes is encompassed within such a term. Preferably, the holes (perforations) are circular or rounded in shape ultimately to produce cylindrically or rounded shaped cleats in the target mat article. Also, the diameter of such perforations are preferably from about 1/64 inch to about 1/2 inch; more preferably from about 1/32 inch to about 1/4 inch; and most preferably from about 3/32 to about 1/16 inch. The preferred thickness of the fabric article and resultant cleats is from about 10–100 mils, preferably about 20–90 mils, more preferably about 30–60 mils, and most preferably about 30–40 mils.

Preferably, the perforated woven fabric article of the instant invention is present in the form of a conveyor belt which thereby permits an in-line mat production procedure. In such a form, a platen liner (or release sheet) should be utilized under the conveyor belt in order to reduce off-quality cleat production, as discussed below. However, if desired, the woven fabric article may also be a separate article which is cut from a web of fabric which can be placed by hand on top of a cushioned platen liner and/or on a conveyor belt within a mat manufacturing apparatus. After vulcanization, the finished mat can easily be removed from the fabric article and the fabric article can then be transported to a pre-vulcanization location for placement of another rubber mat component thereon. The preferred fabric belt or article of the instant invention should be constructed of material which not only can withstand continuous and/or repeated movement around a rotating drum and through a standard in-line floor mat manufacturing apparatus, but such materials (including the cut-out forms of such woven fabric articles) should also be able to withstand the high temperatures and pressures associated with rubber vulcanization. The core material of such a belt or cut-out is thus preferably fiberglass although other materials, such as polyaramids, silicon, and the like, may also be utilized. The belt or cut-out should also be coated with a covering which can also withstand vulcanization temperatures and pressures and not appreciably adhere to molten rubber. Silicon or silicon rubber may be utilized for this purpose as well; however, the preferred coating is polyfluoroethylene, also known as Teflon®, available from DuPont.

The preferred conveyor belt (or cut-out fabric) is first produced by taking a woven (or non-woven) fiberglass fabric and coating it with a certain number of polytetrafluoroethylene (PTFE) or Teflon® layers. Perforations are then cut into the coated fabric to conform with the desired shape and orientation of ultimately formed cleats on the target floor mat or article. Then, the cut fabric is coated with a few more layers of Teflon® in order to insure the potentially frayed fibers of the cut fiberglass will not interfere with the eventual removal of the target floor mat article from the belt surface. If such frayed fiber ends were not coated themselves, they could adhere to the mat and produce aesthetically displeasing results. The coated fabric, and thus the belt itself, may have a thickness of from about 1/64 inch to about 1/2 inch, depending on the desired size of the ultimately formed cleats or protrusions. The thickness of the fabric (belt) dictates the length of the projected cleats from the rubber surface of the mat article since, upon melting during vulcanization, the rubber will become forced through the perforations of the belt a distance roughly the same as the belt thickness. Preferably, the cleat lengths are from about 1/64 to 1/2 inch, more preferably from about 1/32 inch to about 1/4 inch; most preferably about 2/32 inch to about 3/32 inch.

The woven or non-woven structure of such a fabric article provides an extra anti-slip weave pattern feature to the finished floor mat product. Since woven or non-woven fabrics exhibit differing textures at their surfaces due to the interlacing and crossovers of the individual yarns within the structure, the mirror image of such a woven or non-woven structure will be transferred to the target rubber mat component during vulcanization as long as the fabric article remains in place under the rubber component during such a step. In the past, the production of cleats has been performed, as noted above, with silicon pads, and the like, which produced discrete cleats within the rubber mat component but generally did not include any anti-slip features between such produced cleat formations. Through the utilization of such a woven or textured structure, the resultant fabric pattern or texture can thus be transferred to the rubber surface which provides a roughened surface between produced cleats or protrusions for improved anti-slip characteristics or aesthetics within the inventive floor mat.

Prior to incorporating the aforementioned preferred conveyor belt to a floor mat manufacturing apparatus (which generally comprises a metal platen over which the conveyor belt would be placed directly), a platen liner is placed over the metal platen. A platen liner may be placed beneath a hand-placed fabric article on a conveyor belt, or placed within a shelf-type vulcanization chamber.

In general, it has been discovered that the platen liner should be present to avoid the creation of "flared" cleats or flashing in the final mat product. Such a problem is caused by both the lack of adhesion between the molten rubber and the Teflon®-coated fabric surface as well as the force of the metal platen liner on the molten rubber forced through the fabric perforations. Without a cushioning platen liner or sealing liner, when the vulcanization chamber presses down on the mat article, the rubber, upon melting, is forced through the perforations toward the metal platen. The force of the stationary metal platen then forces the rubber back toward the belt and rubber article; however, the molten rubber will seek the path of least resistance rather than returning through the perforation it came originally. Without the adhesion between the fabric and the rubber, the rubber will easily move between the fabric and the platen. In such an instance, upon exiting the vulcanization chamber, the mat article is not easily removed from the belt (since the rubber forms flashing, flares or "hooks" on the underside of the belt). The resultant mat article thus exhibits aesthetically displeasing cleat formations which themselves possess suspect effectiveness at preventing slippage or creeping of the mat when placed on a protected surface. Hence, it was discovered that in order to provide such an efficient procedure of in-line cleat forming for floor mat articles, a cushioned platen liner was used to separate the fabric article (belt) from the metal platen and to provide cushioning of the rubber to prevent re-forcing back toward the belt itself during vulcanization. However, such a platen liner may not be required when a cut-out article is utilized to produce the desired cleats, most notably when the conveyor belt itself (which may be coated rubber, or other fabric, for example) within the mat manufacturing apparatus provides the necessary cushioning effect; but, other times there will be a need to utilize such a cushioned and/or special liner to reduce the production of off-quality cleats.

When present, the platen liner preferably covers the entire area of the metal platen over which mat articles will be placed. Preferably, the platen liner will possess a modulus of from about 40 to 70 on the Shore A Hardness Scale in order to provide the necessary cushioning effects for proper cleat formation. Preferably, the modulus is about 50 on the same scale. Furthermore, the platen liner must be able to withstand the high temperatures and pressures associated with rubber vulcanization. Thus, the liner must be constructed from material which possesses both characteristics. The preferred material is a rubber coated with silicon (available from Taconic, for example) which exhibits a Shore A Hardness of about 50. However, the liner may also be constructed from other heat-resistant materials which have been incorporated within flexible fabrics, rubber, and the like, and/or alternatively coated with a heat-resistant material, such as Teflon®, silicon, and the like. The thickness of such a liner is not of great importance, although, the thicker the better (for cushioning purposes). The utilization of too thick a liner will not seriously impact the effectiveness of the perforated conveyor belt in producing the desired cleats; however, as silicon liners are rather expensive, the thickness should be dictated primarily by cost versus available cushioning characteristics. As such, the liner may have a thickness of from about 1/64 inch to about 1/2 inch. A thickness of about 1/64 to about 1/8 inch is preferred; and 1/64 inch to about 3/32 inch more preferred, and about 30–40 mils is most preferred.

BRIEF DESCRIPTION OF THE DRAWINGS

FIG. 1 is a schematic representation of a floor mat manufacturing machine.

FIG. 2 is an aerial view of a preferred embodiment of the inventive floor mat.

FIG. 3 is an aerial view of the preferred die to form the mat of FIG. 2.

FIG. 4 is a cross-sectional view along lines 4—4 of FIG. 2.

FIG. 5 is a fragmentary perspective view illustration of the composite of platen, platen liner, conveyor belt, and floor mat as described in the above referenced U.S. patent application Ser. No. 09/405,883, now U.S. Pat. No. 6,303,068.

FIG. 6 is a bottom view representation of the floor mat of FIG. 5.

FIG. 7 is a cross-section illustration along line 7—7 of FIG. 6.

FIG. 8 is a perspective view illustration of another inventive floor mat embodiment of the present invention with a unidirectional cleat pattern.

FIG. 9 is a top view representation of the mat of FIG. 8.

FIG. 10 is a bottom or back view illustration of the mat of FIG. 8.

FIG. 11 is a side view illustration of the mat of FIG. 8.

FIG. 12 is an end view representation of the mat of FIG. 8.

FIG. 13 is a fragmentary cross-section illustration taken along line 13—13 in FIG.

FIGS. 14–24 and 26–30 are schematic fragmentary cross-section illustrations of alternative embodiments of floor mats in accordance with the present invention.

FIG. 25 is a partial top view illustration of the floor mat of FIG. 24.

FIGS. 31–33 are respective schematic side view illustrations of the process steps of forming a floor mat in accordance with one method of the present invention using a die mold or plate.

FIGS. 34–36 are respective bottom or back view representations of alternative embodiments of floor mats in accordance with the present invention.

FIGS. 37 and 43 are top view representations of inventive floor mat embodiments of the present invention.

FIGS. 38–42 and 44 are partial top view illustrations of additional inventive floor mat embodiments.

FIGS. 45–47 are schematic side view representations of the process steps of forming a floor mat having upper and lower protrusions or cleats in accordance with another method of the present invention.

FIG. 48 is a schematic partial cross-section representation of a cushion floor mat with flared protrusions and cleats or flashing on the protrusions and cleats.

FIG. 49 is a schematic partial cross-section illustration of a previous mat manufacturing assembly and process.

FIG. 50 is a schematic partial cross-section of the floor mat with a protrusion with flashing produced as shown in FIG. 49.

FIG. 51 is a schematic partial cross-section illustration of an improved mat manufacturing assembly and process.

FIG. 52 is a schematic partial cross-section of the improved mat produced as shown in FIG. 51.

FIGS. 53–55 are schematic cross-section illustrations of an improved mat manufacturing process and product with flashless protrusions.

FIGS. 56–58 are schematic cross-section illustrations of an improved mat manufacturing process and product with flashless protrusions and cleats.

DETAILED DESCRIPTION OF THE DRAWINGS

While the invention will be described in connection with certain preferred embodiments and practices, it is to be understood that it is not intended to in any way limit the invention to such embodiments and practices. On the contrary, it is intended to cover all alternatives, modifications and equivalents as may be included within the spirit and scope of the invention as defined by the appended claims.

The nature of the improvements resulting in the present flashless mat invention is primarily an aesthetic improvement of mats whereby the flashing normally existing on the mat protrusions is virtually eliminated. These protrusions could be either on the surface of the mat or on the back of the mat (such as cleats). Normally, the flashing produces a non-clean or unfinished look on a mat product. The present invention produces a very clean and finished look to the mat protrusions which is appealing to the end user.

The present invention is not only applicable to cushioned rubber floor mats, anti-fatigue mats, or related products but also to other more conventional mat products, such as solid rubber mats, scrapper mats, carpeted mats, or the like which have cleats or other protrusions.

The flashless or nearly flashless protrusions are made by utilizing a release sheet of material which allows air to escape during formation of the protrusion, but limits the flow of rubber or other mat material so that it does not flow past the point of where the intended protrusion is to form. In other words, the resulting protrusions have the dimensions most close to that of which was intended and have little excess material present (little or no flashing, flares, hooks, etc.).

The material of the release sheet or liner is ideally made of a fabric of polyester, nylon, or other synthetic or natural woven material which permits air to be evacuated during vulcanization but which prevents rubber from forming flashing on the protrusions. The material of the release sheet can also be a non-woven material of synthetic and/or natural composition. The release sheet can also be an extruded synthetic sheet of some sort. The release sheet material whether woven, non-woven, or extruded is preferably coated with a layer of material such as Teflon® or silicon to prevent rubber or other mat material from sticking to the release sheet as well as to extend the life of the sheet. The release sheet material does not necessarily require this coating as successful samples were made using a release sheet without such a coating.

One purpose of the invention is to create an improved version of a washable mat made of foam rubber with/ without a dense rubber cap which has the additional improved aesthetic characteristics of having flashless or nearly flashless protrusions.

In accordance with one example of the present invention, the release sheet is made of woven fiberglass.

In accordance with another example, the release sheet is made of non-woven fiberglass coated with Teflon®.

TABLE I

Preferred, Alternative, and Prior Process Release Sheet Material Detail

| Attribute/ Specification | Preferred Material | Alternative #1 Material | Alternative #2 Material | Alternative #3 Material | Prior Process #1 Material | Prior Process #2 Material | Prior Process #3 Material |
| --- | --- | --- | --- | --- | --- | --- | --- |
| 1 Maker | Chukoh Chemical Industries, Ltd. | ChemFab | ChemFab | ChemFab | ChemFab | ChemFab | ChemFab |
| 2 Type ID | FGF-400-14 | Chemglas 183 | Chemglas 400-14 | Chemglas 400-10 | Chemglas 7544 | Chemglas 7330 | Chemglas 313X |
| 3 Weight (g/sq. m.) | 485 | 678 | 360 | 235 | 1050 | 1015 | 1034 |
| 4 Thickness (mm) | 0.33 | 0.6 | 0.33 | 0.19 | 0.9 | 0.8 | 0.7 |
| 5 Material | Fiberglass | Fiberglass | Fiberglass | Fiberglass | Fiberglass | Fiberglass | Fiberglass |
| 6 Coating Type | fluorine PTFE | PTFE | PTFE | PTFE | PTFE | PTFE | PTFE |
| 7 Construction | woven | woven | woven | woven | woven | woven | woven |
| 8 Material Strand Cross-Section Dimensions (approximate width mm × height mm) | 0.75 × 0.2 | 0.75 × 0.1 | 0.75 × 0.1 | 0.5 × 0.05 | 1.55 × 0.34 | 1.48 × 0.41 | 1.44 × 0.36 |

As described in Table 1, we have found that the construction of the preferred and alternative release sheet materials allows air to escape during formation of the protrusions, but limits the flow of rubber so that it does not flow past the point of where the protrusion was intended to form. The air does not necessarily have to flow through the fabric, although depending on the construction of the fabric, it can. The important aspect is that the air does escape and the rubber flow which results in flash is not allowed or is minimized.

The main difference between the preferred/alternative and the prior process materials is that the preferred/alternative material is made up of strands which are smaller with respect to cross-sectional dimension, thus the over all material thickness is less and it has less weight than the prior process material. Because the strands are smaller in the preferred/alternative material, the material is flatter and this helps provide a better seal over the holes in the plate helping inhibit rubber flow during vulcanization. But, the preferred/alternative material has just enough dimension for the air to escape (or in some constructions it flows through the fabric). In contrast, the prior process material allows most of the air to escape, but the strands which make it up are lager with respect to cross-sectional dimension. The seal over the holes in the plate is not as good and the rubber tends to flow around the weave creating the flashing.

At least one embodiment of the present invention nearly eliminates all of the unsightly or undesirable flashing on the protrusions of a mat. In conventional mat making, it has been very difficult to control the amount of flashing by changing the mat material or conditions under which the mat is made such as temperature, time, or pressure. This invention helps eliminate some of the guess work involved and provides the possibility of using a broader range of conditions in which to make a mat and still have a clean, finished looking product.

The flashless or nearly flashless mat or product creates a more desirable finished and clean looking mat or product.

Turning now to the drawings wherein like elements are designated by like reference numerals in the various views, FIG. 1 shows a floor mat manufacturing machine 10 for producing a dust control mat 24. The machine 10 comprises a conveyor belt 11 which carries the mat components 14, 16 from an initial placement area 12 through a vulcanization chamber 22. Thus, a first layer of rubber (including a blowing agent) 14 is co-calendered with a second layer of rubber 16. The composite of layers 14 and 16 is placed on the belt 11. On top of the first rubber layer 14 is then placed a metal die 18. The first rubber layer 14 has a thickness of about 90 mils and the second solid rubber layer 16, being much thinner, has a thickness of about 15 mils. The resultant combination 20, including the metal die 18, is then moved into the vulcanization chamber 22, which includes a heated press (not illustrated) to subject the mat components to a temperature of about 340° F. and a pressure of about 30 psi. After vulcanization, the die 18 is removed from the mat 24.

FIG. 2 gives a more detailed aerial view of the cushioned mat 24. The top cover for the mat 24 is the second solid rubber layer 16. In an alternative embodiment, the second solid rubber layer may cover only a portion of the foam rubber layer (14 of FIG. 1). The cushioned mat 24 includes integrated rubber protrusions 26 which are circular in shape and cylindrical in configuration as they protrude from the mat 24. The mat 24 also includes a frame like raised rectangular border 28. The protrusions 26 provide the cushioning benefits as described more fully above for an anti-fatigue floor covering product.

The preferred die 18 is more thoroughly depicted in FIG. 3. The die is about 1/10 to 1 inch thick, preferably about 0.12–½ inch tall and made of steel or aluminum. Any material may be used for this die 18 as long as it can withstand vulcanization temperatures and pressures without distorting its shape or permanently adhering to the mat product (24 of FIG. 1) (such as, as merely examples, other metals like titanium, aluminum, and the like; fibers, such as polyaramid structures, and the like; silicon molds; and ceramics). The preferred die 18 comprises a plurality of cut-outs 27 which are, again preferably, circular in shape, and thus cylindrical in configuration, having a diameter of about 0.1–0.5 inch and a depth of 1/10–1 inch. It is through these holes 27 that the rubber composition of the first foam rubber layer (14 of FIG. 1) and the second solid rubber layer (16 of FIG. 1) are pressed to ultimately form the desired protrusions (26 of FIGS. 2 and 4) on the bottom side of the preferred mat (24 of FIG. 1).

FIG. 4 thus shows a cross-section of a portion of the finished floor mat 24. Protrusions 26 have been formed comprising a foam rubber core from the first rubber layer 14 and a cap comprising the second solid rubber layer 16. The resultant preferred protrusions 26 are each about 0.375 inch in diameter and about a 0.150 inch in height. The thickness of the solid rubber layer 16 after vulcanization has been reduced from about 15 mils to about 10 mils due to the associated pressures and the forcing of the rubber compositions 14, 16 through the metal die (18 of FIG. 1) during vulcanization.

In FIG. 5 there is shown in profile the composite of different utilized components for production of a pile covered floor mat article 30 (shown in FIGS. 5–7). In the illustrated and preferred practice, a rubber mat backing sheet 32 (made of one or more layers of solid and/or foam rubber) is covered with, at least partially, and attached to (during vulcanization) a pile fabric 34 to form the desired floor mat 30. Cleats 36 or protrusions are formed in certain locations on the underside of the rubber mat backing sheet 32 through placement of the sheet or layers 32 (with or without the pile fabric 34 on top) over a woven or non-woven fabric article, in this instance a conveyor belt 38, which is formed from woven fiberglass and coated with Teflon® and which comprises cut-out holes 40 in certain locations on the belt 38 which correspond to the desired pattern of cleats 36 to be formed on the backing sheet 32. The woven structure of the conveyor belt 38 also transfers such a woven pattern or texture 42 to the backing sheet 32 to provide increased slip resistance supplemental to the cleats 36. In order to permit proper cleat formation on the backing sheet 32, a cushioned platen liner 44 made from silicon rubber is present underneath the conveyor belt 38. All of these layers of articles are placed upon the metal platen 46 (or conveyor belt) of a mat manufacturing apparatus (shown in FIG. 1). The floor mat 30 of FIGS. 6 and 7 has already been transferred by the belt 38 through the vulcanization chamber. Upon removal from the belt 38, the floor mat 30 possesses the desired cleats 36 and woven pattern 42 for anti-creep benefits upon use (FIGS. 5–7)

With reference to FIG. 7, the pile fabric 34 includes tufts 50 and a woven or nonwoven backing or support 52 for the tufts 50. Other materials or layers may be used, for example, woven pile, bonded pile, and the like.

Although it is not necessary to do so, the mats of the present invention can be perforated during or following manufacture thereof to provide very small openings or valves which allow water to pass through the mat while it is being washed (spun) to reduce drying time or eliminate drying altogether following the washing thereof. A spiked roller can be used to create the openings. Alternatively, spikes may be added to the lower surface of the die mold or plate. Further small dowels, studs, or protrusions can be added to the base of the die mold or plate or to the top of the lower support surface to create larger drain openings through the mat.

With respect to FIG. 8 of the drawings, a floor mat 60 includes a plurality of raised protrusions or cleats 62 arranged in longitudinally oriented groups 64 and laterally or transversely oriented groups 66. In the embodiment shown in FIG. 8, each group contains four protrusions or cleats 62 with each protrusion or cleat being in the form of an elongate oval and having length dimensions of from about 1 to 4 inches, preferably 2 to 3 inches, and a height of about 1/8 to 1 inch, preferably 1/8 to 0.375 inch.

The floor mat 60 also has a frame like raised edge or border 68 which is raised to a height about equal to that of the protrusions or cleats 62, or may also be higher than or lower than the protrusions 62 as desired. Also, it is preferred that the border or edge 68 be tapered so as to become thinner near the outer edge of the mat 60 (FIGS. 11–13). Although the corners 70 of the mat 60 may be squared off, it is preferred that they be curved or rounded. The upper surface 72 of the mat between the protrusions 62 and between the protrusion 62 and the border 68 is shown to be a relatively smooth surface, but may instead be textured, roughened, dimpled, or the like.

The upper surface 74 of the border 68 and upper surface 76 of each of the protrusions 62 has a roughened, dimpled, or textured surface created by the corresponding woven, roughened, dimpled or textured surface of a release layer placed over the die mold on the upper rubber layer prior to vulcanization. This release layer protects the air bladder or diaphragm of the press from the molten rubber. It is contemplated that the upper surfaces 74 and 76 of the border 68 and protrusions 62 as well as the upper surface 72 of the mat 60 between the protrusions and edge or borders 68 may be any desired texture or design since the release layer and/or die mold, plate, belt, or the like may be given a desired corresponding texture which would be transmitted to the rubber to be vulcanized.

With reference to FIGS. 5, 6, and 10 of the drawings, a back surface 78 of floor mat 60 has a textured, roughened or dimpled surface which corresponds to the abutting surface of the plate, fabric article, conveyor belt, release liner, or platen liner, or the like placed below the lower rubber layer prior to vulcanization. Although the back or bottom 78 of floor mat 60 is shown without protrusions 62 or anti-creep cleats or nubs such as cleats 36 of FIGS. 5–7 of the drawings, it is to be understood that such cleats and/or protrusions may be added as desired (see FIGS. 17–21).

With reference to FIGS. 8, 11, 12, and 13 of the drawings, the floor mat 60 includes an outer edge 82 which is preferably substantially vertical. In accordance with one embodiment of the present invention, this outer edge 82 has a vertical height of about 1/8 to 1/2 inch, preferably 1/8 to 1/4 inch.

Depending on the size of the floor mat 60, such as 1'×1', 2'×2', 2'×3', 3'×5', 6'×9', 3'×10', or the like the edge or border 68 may be from about 1/2 inch to 4 inches wide, preferably about 1 to 3 inches wide. Also, it is contemplated that the floor mat may be made without a raised border 68 or with a raised border 68 having a constant height across its width.

With reference to FIGS. 4 and 13 of the drawings, it is preferred that the floor mat 60 be formed of at least two layers of rubber, a first layer 84 of a foam or foamed rubber and a second or cap layer 86 of a solid rubber. Although, only two layers are shown in FIG. 13, it is contemplated that the floor mat 60 may include a third thin capping layer of solid rubber on the bottom surface of the floor mat so as to encapsulate the foam layer 84 between two solid rubber layers and that the layers 84 and/or 86 may be formed of multiple layers.

Depending on how the floor mat 60 is constructed or finished (trimmed), the edge 82 may be cut with a knife, laser, or the like and may be covered with a layer of solid rubber or have a portion of the foam exposed as shown.

Like FIGS. 4 and 13 of the drawings, FIGS. 14–30 of the drawings depict partial or fragmentary schematic cross-sections of various embodiments of floor mat constructions in accordance with the present invention.

With respect to FIG. 14, there is shown a floor mat 90 having protrusions 92, a border 94, and an edge 96 each covered with a thin solid rubber cap layer 98 overtop of a foam rubber layer 100. The protrusions or cleats 92 are preferably cylindrical, but may be any size or shape such as square, rectangular, polygonal, triangular, hemispherical, or the like.

As shown in FIG. 15 and in accordance with another embodiment, a floor mat 110, similar to that of FIG. 14, includes protrusions or cleats 112, a border 114, and an edge 116 covered by thin solid rubber cap layer 118. The floor mat 110 further includes a bottom or back surface 120 covered by a thin solid rubber cap layer 122. The cap layers 118 and 122 enclose a foam core or layer 124.

With respect to FIG. 16 of the drawings, a floor mat 130 includes protrusions 132, a border 134, an edge 136, and a bottom 138. The floor mat 130 is constructed of one or more foam layers 140. The embodiment shown in FIG. 16 does not a include solid rubber cap layer or layers.

As shown in FIG. 17 of the drawings and in accordance with another embodiment of the present invention, a floor mat 150 is somewhat reversed with respect to the earlier described mats and includes protrusions 152 and a border 154 on the bottom or lower surface 156 of the mat. Further, the floor mat 150 includes an edge 158 at a slight angle to the vertical. Still further, the floor mat 150 includes an upper surface 160 covered with a thin solid rubber cap layer 162. The cap layer 162 covers a foam layer or layers 164. The upper surface 160 includes an angled portion 164 near the edge of the mat so that the mat tapers down toward the edge 158. The upper surface 160 is smooth or substantially smooth to make cleaning of the upper surface easier as compared to a rough or textured surface.

The floor mat 150 of FIG. 17 of the drawings, as well as the floor mat shown in FIGS. 18, 22, 23, 27, and 30 of the drawings, provide a relatively smooth upper surface which is relatively easy to clean. Such a floor mat 150 is especially suited for use, for example, as an anti-fatigue mat in an area where the floor surface needs to be cleaned regularly by sweeping, vacuuming, or the like. For instance, the floor mat 150 is especially suited for use in a barber shop or hair styling salon around the base of a barber's chair or hair styling chair where hair tends to accumulate and must be frequently cleared away.

The floor mat 150 provides cushioning effect or compression like the floor mats 90, 110, and 130, and serves as an anti-fatigue floor mat. The upper surface 160 of floor mat 150 may include dimples, texturing, or roughening (such as shown in FIGS. 8, 9, or 10 of the drawings) while still providing for easy cleaning of the upper surface of the floor mat. Such a roughening or texturing of the upper surface 160 may add to the aesthetics, anti-slip or safety of floor mat. Further, the protrusions 152 serve as anti-creep cleats or protrusions on the bottom of the floor mat 150.

With respect to FIG. 18, there is shown a floor mat 170 similar to the mat 150 of FIG. 17, except that it has a straight or vertical side edge 180 and includes an additional lower cap layer 178. The floor mat 170 has protrusions 172, a border 174, and the bottom surface 176. The bottom surface 176 is covered with the thin solid rubber cap layer 178. The floor mat 170 further includes the vertical edge 180 and a top surface 182 covered with a thin solid rubber cap layer 184. The cap layers 178 and 184 encapsulate a foam rubber layer 186. The top surface 182 of mat 170 has an angle portion 188 along the edges of the mat to provide a taper thereto.

With reference to FIG. 19 of the drawings, a floor mat 190 is shown which is similar to floor mat 90 of FIG. 14, except that the bottom surface 192 includes a plurality of anti-creep cleats or protrusions 194 such as shown in FIGS. 5, 6, and 7 of the drawings. Further, the floor mat 190 differs from the mat 90 in that the edge 196 is not covered with the thin solid rubber cap layer 198.

As shown in FIG. 20 of the drawings, a floor mat 210 is similar to the floor mat 110 of FIG. 15, except that a plurality of cleats or protrusions 212 have been added to the bottom 214 to provide anti-creep properties to the floor mat.

With reference to FIG. 21, a floor mat 220 is similar to mat 130 of FIG. 16, except that cleats 222 have been added to bottom surface 224.

With respect to FIG. 22 of the drawings, a floor mat 250 is similar to the floor mat 150 of FIG. 17, except that rounded nubs or bumps 252 have been added to the upper surface 254.

As shown in FIG. 23 of the drawings, a floor mat 270 is similar to the floor mat 170 of FIG. 18, except that rounded nubs or bumps 272 have been added to the upper surface 274 and the edge 276 is cut at a taper and does not include a solid rubber cap layer.

With reference to FIGS. 24–30 of the drawings and in accordance with another embodiment of the present invention, a plurality of smaller cylindrical protrusions having conical or angled bases replace the larger cylindrical protrusions of, for example, FIGS. 2, 4, and 14–23 of the drawings.

As shown in FIGS. 24 and 25 of the drawings, a floor mat 300 similar to the floor mat 90 of FIG. 14 includes a plurality of protrusions 302, a border 304, and an edge 306 covered by a thin solid rubber cap layer 308. Each of the protrusions 302 has a top or upper end cylindrical portion 310 and a lower conical or angled portion 312. Floor mat 300 has a bottom surface 314 and a foam rubber layer 316.

In accordance with a particular embodiment of the present invention, each of the protrusions 302 has a 0.15 inch diameter cylindrical top portion 310 with spacing between adjacent protrusions 302 of about 0.60 inches on center. Also, in accordance with this particular embodiment, the row or column of protrusions 302 adjacent the border 304 is spaced from the border by about 0.50 to 0.75 inches and the border itself is about 1 to 3 inches wide. Also, in accordance with this particular embodiment, the floor mat 300 has an overall height of about 0.5 to 1.5 inches.

The floor mat 300 of FIGS. 24 and 25 of the drawings is believed to have enhanced comfort, anti-fatigue, and compression characteristics over that of the floor mat 24 of the floor mat 24 of FIG. 2 or 60 of FIG. 8 because the smaller size or diameter of the protrusions 302 allows them to flex or give more than protrusions 26 or 62.

Although the surface 312 at the bottom of each of the protrusions 302 is shown angled, it is contemplated that this surface may be carved or may include a plurality of different angled sections. Also, it is contemplated that the protrusions 302 may be cylindrical over their entire length or height.

As shown in FIG. 26 of the drawings, a floor mat 320 is similar to floor mat 110 of FIG. 15 except that it includes small diameter cylindrical protrusions like that of floor mat 300. Floor mat 320 includes a plurality of protrusions 322, a border 324, and an edge 326 covered with at thin cap layer 328. Floor mat 320 further includes a bottom 330 covered with a thin cap layer 332. Cap layers 328 and 332 enclose a foam core 334.

With reference to FIG. 27 of the drawings, a floor mat 340 similar to the floor mat 170 of FIG. 18 includes a plurality of protrusions 342 and a border 346 covered with a thin rubber cap layer 348. Further, floor mat 340 includes a horizontal top surface 350, an angled top surface 352, and an angled edge 354 covered with a thin rubber cap layer 356. The cap layers 348 and 356 encapsulate a foam rubber core 358.

With respect to FIGS. 28, 29, and 30 of the drawings, floor mats 370, 380, and 390 are substantially similar to floor mats 300, 320, and 340 of FIGS. 24, 26, and 26 except that floor mat 370 includes a plurality of protrusions or cleats 372 to enhance the gripping force of the floor mat with a floor (anti-creep) and edge 374 does not include a thin cap layer. Likewise, floor mat 380 includes a plurality of cleats or protrusions 382 and an edge 384 without a cap layer. Similarly, floor mat 390 includes a plurality of rounded nubs or bumps 392 and an edge 394 without a cap layer.

Although the preferred embodiment of the present invention is two or more layers, for example, a foam layer and one or more thin solid cap layers, it is to be understood the foam layer may be one or more layers of uncured rubber including blowing agents and may be the same or different compositions, but which form foam or foamed materials. For example, a mat may have a top layer of a solid rubber, a second layer below that of a foam rubber with a limited amount of blowing agent, a third layer below that of a foam rubber with a high amount of blowing agent, and a fourth or bottom layer of solid rubber cap.

Also, although it is preferred to form the anti-fatigue mats with a foam layer, it is contemplated that one may form a scraper mat out of one or more layers of solid rubber while still having similar protrusions or cleats on the top and/or bottom of the mat.

Also, it is contemplated that at least the top layer of the floor mat can include anti-microbial, anti-bacterial, anti-fungal agents or compounds. Further, at least the top rubber layer may be any of various colors, such as black, brown, gray, etc. Also, the protrusions and/or border may be different colors. The rubber layers can be compounded with colors therein or an additional color polymer layer may be added on top.

FIGS. 31–33 of the drawings depict a schematic molding process wherein a molding plate or die mold is placed on top of one or more layers of uncured rubber (FIG. 31). The composite of the plate and uncured rubber layer or layers is placed in a vulcanization press and vulcanized and during vulcanization rubber flows up into the holes in the plate (FIG. 32).

Following vulcanization, the plate is removed to leave the finished mat (FIG. 33). Also, the mat may need to be trimmed to remove any excess, create straight edges, round the corners, or the like.

With respect to FIGS. 34–36 of the drawings, several different embodiments of back or bottom surfaces of the floor mats are shown. It is to be understood that a particular back or bottom surface based on the intended use of the floor mat. FIG. 34 depicts a smooth texture. FIG. 35 depicts a rough texture. FIG. 36 depicts a texture having small raised nubs or cleats. Such textures on the bottom surface of the mat can be created by a textured belt, plate, pad, release material, liner, or the like.

FIG. 37 of the drawings shows a borderless floor mat 450 having a plurality of protrusions or cleats 452 arranged in stripes or patterns and an edge 454 which does not include a raised border or frame. Although the protrusions 452, such as cylindrical protrusions are shown to be arranged in diagonal stripes or groups, it is to be understood that the protrusions may be arranged in any grouping, shape, or the like and still provide the desired cushioning to the floor mat.

A borderless mat such as shown in FIG. 37 can be created by using a plate or die mold which extends beyond the edge of the uncured rubber layer or layers, by inverting the rubber layers and placing them on top of the plate, or by simply trimming the border off of the mat.

FIGS. 38–44 of the drawings depict additional floor mat embodiments like the floor mats 24, 60, 90,110,130,190, 210, 20, and 450, except that the protrusions or cleats are in different shapes, patterns, groups, or the like. Although FIGS. 38–44 are top views of respective floor mat embodiments, it is contemplated that similar such protrusions or cleats can be formed on the top and/or bottom of the mats.

FIG. 38 shows a mat 500 with lobed or rounded cross shaped protrusions 502 and a raised border 504.

FIG. 39 shows a mat or article 510 with octagonal shaped protrusions, 512 and a raised border 514.

FIG. 40 shows a mat 520 with triangular shaped protrusions 522 and a raised border 524.

FIG. 41 shows a mat or article 530 with groups of protrusions 532 including large and small protrusions, 534 and 536, and a raised border 538.

FIG. 42 shows a mat 540 with rows 542 of rectangular protrusions 544 and a raised border 546.

FIG. 43 shows a mat or article 550 with diamond shaped protrusions, 552 and a raised border 554.

FIG. 44 shows a mat 560 with letter shaped protrusions 562 and star shaped protrusions 564 and a raised border 566.

FIGS. 45–47 of the drawings depict another schematic molding process (like that of FIG. 5) wherein one or more uncured rubber layers are place atop a lower belt or plate which rests on a liner, an upper molding plate or die mold is placed on top of one or more layers of uncured rubber (FIG. 45). The composite of the plate, uncured rubber layer or layers, belt and liner is placed in a vulcanization press and vulcanized and during vulcanization rubber flows into the holes in the plate and belt (FIG. 46).

Following vulcanization, the plate and belt is removed to leave the finished mat (FIG. 47). Also, the mat may need to be trimmed to remove any excess, create straight edges, round the corners, or the like.

With reference to FIGS. 48–50, depending on the mat construction and/or manufacturing process, mats may be produced having undesirable flashing on the protrusions and/or cleats thereof. With reference to FIG. 5 of the drawings, flashing on the cleats is addressed using a cushioned platen liner.

In accordance with another embodiment of the present invention as shown in FIGS. 51 and 53–58 of the drawings, flashing on the protrusions and/or cleats is addressed, reduced, or eliminated using a new release sheet, liner or material above the protrusion forming die mold, plate, belt, or the like and/or below the cleat forming belt, pad, plate, or the like.

The preferred flash reducing release sheet (cover sheet or bottom sheet) forms a good seal with the plate or belt and allows air to escape during formation of the protrusion, but limits the flow of molten rubber or other mat material so that it does not flow past the point of where the intended protrusion was to form.

In contrast to the mat having flashing as shown in FIG. 48, a similar mat without flashing is shown in FIG. 19 of the drawings. Mat 190A of FIG. 48 has flashing 200 extending from the upper surface of protrusions 202 and flashing 204 extending from the lower surface of cleats 194.

With reference to FIGS. 5 and 56–58 of the drawings, the special release bottom sheet may also provide cushioning.

With reference to FIGS. 51 and 53–58 of the drawings, the new release cover sheet 610 is used over a die mold or plate 612 having a plurality of openings 614 to produce a mat 616 with a plurality of corresponding flashless protrusions 618.

As shown in FIGS. 53–55 of the drawings, an exemplary mat making process includes the steps of:

forming a composite of one or more layers of uncured rubber, a die mold or plate placed thereon, and then a release cover sheet placed over the plate, vulcanizing the composite in a press in a manner forcing molten rubber up into the openings 614 in plate 612 with the release sheet 610 allowing air to escape while preventing molten rubber from exiting openings 614, and removing the release cover sheet and plate from the mat 616.

With reference to FIGS. 56–58 of the drawings, there is added a perforated belt 620, and a special release bottom sheet 622 to form an exemplary mat 624 with not only protrusions 626, but also cleats 628.

As shown in FIGS. 56–58 of the drawings, an exemplary mat making process includes the steps of:

forming a composite of a special release bottom sheet 622, perforated belt or pad 620, one or more layers of uncured rubber, a die mold or plate 612, and a special release coversheet 610, vulcanizing the composite in a manner forcing molten rubber into openings in the plate and perforated belt, and removing the coversheet, plate, and mat from the perforated belt.

In accordance with the present invention, the term "a substantially flashless" mat, product, protrusion, cleat, or the like, is intended to mean a mat, product, protrusion cleat, or the like having flashing of less than about 3 mm, preferably less than 2 mm, and most preferably less than 1 mm. A mat, product, protrusion, cleat, or the like without visible flashing is made possible by utilizing the special release material, sheet, liner, coversheet, bottom sheet, and/or the like of the present invention.

As previously indicated, in the preferred embodiment of the present invention the base material for the first foam rubber layer is acrylonitrile-butadiene rubber (NBR) or styrene-butadiene rubber (SBR). Other materials which may also be used include, by way of example, hydrogenated NBR, carboxylated NBR, EPDM, and generally any other standard types of rubbers which may be formed in a foam state. As will be appreciated, the use of NBR or SBR is desirable from a cost perspective.

The present invention makes use of the addition of chemical blowing agents to the rubber materials ultimately yielding a lighter rubber sheet. Specifically, the rubber backing sheet of the present invention comprises either NBR or SBR or both mixed with a blowing agent. The rubber/blowing agent mixture is thereafter calendared as a solid sheet of unvulcanized. In practice, the raw NBR is believed to be available from Miles Inc. Rubber Division in Akron, Ohio. The SBR may be purchased from Goodyear Tire and Rubber Company in Akron, Ohio. EPDM may also be added in a preferred embodiment to provide ozone resistance and other properties.

In the preferred practice of the present invention, a masterbatch of the polymer components is first prepared by mixing the base rubber (either NBR or SBR) with the additive ozone resistant polymer (EPDM) in the desired ratio along with various stabilizers and processing agents. Exemplary compositions of the masterbatch for various additive ratios wherein EPDM is mixed with NBR are provided in Table 1A for ratios of NBR to the additive polymer of 9.0 (Column a), 2.3 (Column b) and 1.2 (Column c).

TABLE 1A

| MATERIAL | PARTS BY WEIGHT | | | |
|---|---|---|---|---|
| | a | b | c | d |
| Rubber (NBR) | 40 | 25 | 50 | 100 |
| Additive Rubber (EPDM) | 60 | 75 | 50 | 0 |
| Plasticizer | 10 | 5 | 15 | 15 |
| Stabilizer | 2 | 2 | 2 | 1.5 |
| Processing Aid | 1.75 | 1.75 | 1.75 | 1.5 |
| Antioxidant | 1.2 | 1.2 | 1.2 | 2.0 |

In the preferred practice the plasticizer which is used is diisononylphthalate. The stabilizer is trinonylphenolphosphate available from Uniroyal Chemical under the trade designation Polyguard. The processing aid is purchased from the R. T. Vanderbilt Company in Norwalk Conn. under the trade designation Vanfree AP-2. The antioxidant is purchased from Uniroyal Chemical under the trade designation Octamine.

Following the mixing of the masterbatch, curative agents are added in a second stage mixing process for formation of the raw rubber compound which forms the backing sheet of the floor covering article of the present invention. An exemplary composition of the raw rubber compound formed in this second stage mixing process is provided in Table 1B.

TABLE 1B

| MATERIAL | PARTS BY WEIGHT |
|---|---|
| Masterbatch Blend | 100 |
| Sulfur | 1.25 |
| Stearic Acid | 1 |
| Carbon Black N-550 | 40 |
| Vulkacit Thiaram MS (TMTM) | 0.5 |
| Zinc Oxide | 5 |
| Blowing Agent | 2.5 |

Exemplary composition of the masterbatch for various additive ratios of SBR to EPDM are provided in Table 2A in a manner similar to that of Table 1 A.

TABLE 2A

| MATERIAL | PARTS BY WEIGHT | | | |
|---|---|---|---|---|
| | a | b | c | d |
| Rubber (SBR) | 40 | 25 | 50 | 100 |
| Additive Rubber (EPDM) | 60 | 75 | 50 | 0 |
| Stearic Acid | 1 | 1 | 1 | 1 |
| Sunolite 240 | 2 | 2 | 2 | 2 |
| Zinc Oxide | 5 | 5 | 5 | 4 |
| Carbon Black N-550 | 30 | 30 | 30 | 40 |
| Carbon Black N-224 | 60 | 60 | 60 | 50 |
| Calcium Carbonate | 35 | 35 | 35 | 30 |
| Talc | 30 | 30 | 30 | 30 |
| Supar 2280 | 80 | 80 | 80 | 80 |

After mixing of the SBR masterbatch, curative agents are preferably added in a second stage mixing process for formation of the raw rubber compound which forms the backing sheet of the floor covering article of the present invention. An exemplary composition of the raw rubber compound formed in this second stage mixing process is provided in Table 2B.

TABLE 2B

| MATERIAL | PARTS BY WEIGHT |
|---|---|
| Masterbatch Blend | 100 |
| Sulfur | 2 |
| Methyl Zimate | 1.25 |
| Butyl Zimate | 1.25 |
| Dibutyl Thiurea | 2.50 |
| Tellurium Diethyldithiocarbanate | 1 |
| Blowing Agent | 2.0 |

As previously indicated and shown above, the first foam rubber layer includes a blowing agent to effectuate the formation of closed gas cells in the rubber during vulcanization. The second solid rubber is thus preferably the same compositions as those listed above but without the addition of a blowing agent. Such a second layer is also preferably calendared to a thickness far thinner than for the first foam rubber layer in order to form the required solid rubber cap. The blowing agent for the first foam rubber layer is preferably a nitrogen compound organic type agent which is stable at normal storage and mixing temperatures but which undergoes controllable gas evolution at reasonably well defined decomposition temperatures. By way of example only and not limitation, blowing agents which may be used include: azodicarbonamide (Celogen AZ-type blowing agents) available from Uniroyal Chemical Inc. in Middlebury Conn. and modified azodicarbonamide available from Miles Chemical in Akron, Ohio under the trade designation Porofor ADC-K.

It has been found that the addition of such blowing agents at a level of between about 1 and about 5 parts by weight in the raw rubber composition yields a rubber sheet having an expansion factor of between about 50 and 200 percent. After the fluxing processes are completed, the uncured first rubber layer containing EPDM and the blowing agent are assembled with the second unvulcanized solid rubber layer placed over the first as previously described. A die, as previously described, is then placed over the second layer. The vulcanization of the two rubber layers is then at least partially effected within the press molding apparatus wherein the applied pressure is between 20 and 40 psi. Under the high temperatures and pressure, the nitrogen which is formed by the blowing agent partly dissolves in the rubber. Due to the high internal gas pressure, small closed gas cells are formed within the first rubber layer as the pressure is relieved upon exit from the press molding apparatus. In an alternative practice a post cure oven may be used to complete the vulcanization of the mat and provide additional stability to the resulting product.

EXAMPLE I

Two separate rubber sheet materials were produced by fluxing together the materials as set forth in Table 1A in a standard rubber internal mixer at a temperature of about 280° F. to 300° F. for a period of one to two minutes. EPDM additions were made as shown in Table 1A to yield a ratio of EPDM to NBR of 3.0. Additions of curative agents as provided in Table 1B were then made for two separate rubber sheets, however, the second did not include the blowing agent. The first sheet, including the blowing agent, being an uncured sheet of the fluxed rubber compounds was then calendared to a thickness of about 40 mils, having a width of approximately 3 feet and a length of approximately 4 and-a-half feet. The second sheet, also being uncured, was then calendared to a thickness of about 20 mils and having the same dimension as the first sheet. The first sheet was then placed on a silicon mold (to form cleats in the ultimate floor mat) and covered entirely on its surface with the second sheet. A die mold having a plurality of cylindrically configured openings was then placed over the second sheet. The die mold was approximately 2 feet, 8 inches wide and 4 feet 2 inches long. The die mold/rubber sheets composite was then cured at a temperature of about 350° F. for fifteen (15) minutes under a pressure of about 40 psi and post-cured at a temperature of about 290° F. at atmospheric pressure for a period of five (5) minutes. The resultant floor mat possessed a border of solid rubber reinforcement around the perimeter of the structure of four inches wide as well as a middle section comprising a plurality of cylindrically configured protrusions having a solid rubber cap over a foam rubber core. Cleat structures were also present on the bottom of the vulcanized first rubber sheet. The first and second layers of rubber became permanently adhered together as well. The resultant mat article provided a significant amount of cushioning.

A similar mat comprised of all solid rubber but with the same configurations and number of integrated rubber protrusions was also produced and tested against the inventive mat for washability, abrasion resistance, compression, and resiliency. On an empirical scale of 1 to 5, in which 5 is considered the best, the inventive mat exhibited a rating of 5 as to visual appearance after 200 industrial washings in a rotary washing machine. The comparative solid rubber mat could not be washed at all in such a manner without damaging the machine. Abrasion resistance was tested through the utilization of a rotating foot mechanism to simulate foot traffic where one thousand cycles is interpreted as about one year of use. The inventive mat rated a 4 on the visual appearance scale after such a duration; the comparative mat rated a 1. Compression testing concerned the force necessary to reduce material height by 25% of its original height. A greater amount indicated a more cushioned product (and thus a better product for continuous pedestrian use or for use as a floor covering for an appreciable amount of time). The inventive mat exhibited an ease of compression 5 times greater than that for the comparative mat. Lastly, resiliency was tested as the measurement of the height percent recovered after 50% compression at 120° F. for 24 continuous hours. Such a test thus concerns the ability of the mat to retain its shape after long duration of use. The inventive mat exhibited a resiliency of above 90% after such a harsh test while the competitive mat was below 40%. Thus, in all the aforementioned tests, the utilization of a specific solid rubber cap over a foam rubber layer, as well as the presence of protrusions possessing the same type of two-layer arrangement, provided a far superior mat product in terms of comfort, resiliency, and washability.

EXAMPLE II

Two separate rubber sheet materials are produced by fluxing together the materials as set forth in Table 1A in a standard rubber internal mixer at a temperature of about 280° F. to 300° F. for a period of one to two minutes. EPDM additions are made as shown in Table 1A to yield a ratio of EPDM to NBR of 3.0. Additions of curative agents as provided in Table 1B are then made for two separate rubber sheets, however, the second does not include the blowing agent. The first sheet, including the blowing agent, being an uncured sheet of the fluxed rubber compounds is then calendared to a thickness of about 40 mils, having a width of approximately 4 feet and a length of approximately 6 feet. The second sheet, also being uncured, is then calendared to a thickness of about 5 mils and having the same dimension as the first sheet. The first sheet is then placed on a silicon mold or belt (to form cleats in the ultimate floor mat) and covered entirely on its surface with the second sheet. A die mold having a plurality of octagonally configured openings is then placed over the second sheet. The die mold is approximately 3 feet, 8 inches wide and 5 feet 8 inches long. The die mold/rubber sheets composite was then cured at a temperature of about 350° F. for ten (10) minutes under a pressure of about 30 psi and post-cured at a temperature of about 290° F. at atmospheric pressure for a period of five (5) minutes. The resultant floor mat possesses a border of solid rubber reinforcement around the perimeter of the structure of two inches wide as well as a middle section comprising a plurality of octagonally configured protrusions having a solid rubber cap over a foam rubber core. Cleat structures are also present on the bottom of the vulcanized first rubber sheet. The first and second layers of rubber become permanently adhered together as well. The resultant mat article provided a significant amount of cushioning.

EXAMPLE III

Three separate rubber sheet materials are produced by fluxing together the materials as set forth in Table 1A in a standard rubber internal mixer at a temperature of about 280° F. to 300° F. for a period of one to two minutes. EPDM additions are made as shown in Table 1A to yield a ratio of EPDM to NBR of 3.0. Additions of curative agents as provided in Table 1B are then made for three separate rubber sheets, however, the second and third do not include the blowing agent. The first sheet, including the blowing agent, being an uncured sheet of the fluxed rubber compounds is then calendared to a thickness of about 60 mils, having a width of approximately 3 feet and a length of approximately 4 and-a-half feet. The second and third sheets, also being uncured, are then calendared to a thickness of about 10 mils and having the same dimension as the first sheet. The third sheet is then placed on a mold or belt (to form cleats in the bottom of the ultimate floor mat) and covered entirely on its surface with the first sheet and then the second sheet is placed over the first sheet. A die mold having a plurality of cylindrically configured openings was then placed over the second sheet. The die mold is approximately 2 feet, 8 inches wide and 4 feet 2 inches long. The die mold/three rubber sheets composite is then cured at a temperature of about 290° F. for fifteen (15) minutes under a pressure of about 40 psi and post-cured at a temperature of about 290° F. at atmospheric pressure for a period of five (5) minutes. The resultant floor mat possesses a border of solid rubber reinforcement around the perimeter of the structure of two inches wide as well as a middle section comprising a plurality of cylindrically configured protrusions having a solid rubber cap over a foam rubber core. Solid rubber cleat structures are also present on the bottom of the vulcanized first rubber sheet. The first, second, and third layers of rubber become permanently adhered together as well. The resultant mat article provided a significant amount of cushioning.

While the invention has been described and disclosed in connection with certain preferred embodiments and procedures, these have by no means been intended to limit the invention to such specific embodiments and procedures. Rather, the invention is intended to cover all such alternative embodiments, procedures, and modifications thereto as may fall within the true spirit and scope of the invention as defined and limited only by the appended claims.

What I/we claim is:

1. A flashless cushioned floor mat adapted to withstand rigorous industrial washing comprising:
   a rubber mat structure comprising:
   at least a first layer comprised of foam rubber; and
   a plurality of substantially flashless protrusions having substantially vertical sidewalls integrated within said rubber mat structure and being formed in part by a flash reducing material which forms a seal with a perforated protrusion forming item and allows air to escape during formation of the protrusions while limiting the flow of molten rubber.

2. The floor mat of claim 1, wherein said rubber mat structure further comprises at least a second layer comprised of a solid rubber.

3. The floor mat of claim 2, wherein at least one of said protrusions has a core portion and an outside surface portion, wherein the core portion of said at least one protrusion is comprised of said first layer of foam rubber and wherein the outside surface portion of said at least one protrusion is comprised of said second layer of solid rubber.

4. The floor mat of claim 1 wherein at least one of said flashless protrusions integrated within said mat structure has a cross section shape selected from the group consisting of circular, oval, elliptical, octagonal, rounded, and polygonal.

5. The floor mat of claim 1 wherein at least one of said flashless protrusions integrated within said rubber mat structure is located on the top surface of said mat.

6. The floor mat of claim 1 wherein the thickness of the resultant first layer of foam rubber is from about 5 to about 500 mils.

7. The floor mat of claim 2 wherein said rubber mat structure further comprises a third layer comprised of a solid rubber.

8. The floor mat of claim 1, wherein said rubber mat structure includes at least one of cleats and texture on one of the upper or lower surfaces thereof.

9. The floor mat of claim 2, wherein the thickness the resultant second layer of solid rubber is from about 2 to about 50 mils.

10. The floor mat of claim 7, wherein the thickness of the resultant third layer of solid rubber is from about 2 to about 50 mils.

11. The floor mat of claim 1 wherein the flashless protrusions are selected from shapes or arrangements selected from the group consisting of groups, designs, patterns, stripes, and combinations thereof.

12. The floor mat of claim 1 wherein the thickness of the resultant first layer of foam rubber is from about 75 to about 250 mils.

13. The floor mat of claim 9, wherein and the thickness of the resultant second layer of solid rubber is from about 15 to about 25 mils.

14. A method of a forming a flashless rubber dust control mat adapted to withstand rigorous industrial washing and having a plurality of substantially flashless protrusions having substantially vertical sidewalls comprising the steps of
   (a) placing a die having at least a first and second side over at least a portion of at least one layer of unvulcanized rubber, wherein said die has a plurality of protrusion forming openings to allow for the entry of molten rubber, and wherein said die is comprised of a material which can withstand vulcanization temperatures and pressures;
   (b) placing a release cover sheet over the die, wherein the release cover sheet is formed of a material and in such a manner as to allow air to escape during formation of the protrusion and limits the flow of rubber or other mat material past the point of where the intended protrusion is to form;
   (c) subjecting the resultant composite comprising at least one layer of unvulcanized rubber, the die, and the release cover sheet to vulcanization temperatures and pressures to vulcanize the at least one layer of rubber, and to form a plurality of substantially flashless rubber protrusions through the openings of the die.

15. The method of claim 14, wherein at least one of said resultant flashless rubber protrusions comprises a core of foam rubber and an outside surface of solid rubber.

16. The method of claim 14 wherein said removed portions of said die are substantially in the shape selected from the group consisting of letters, numbers, designs, patterns, circles, ovals, ellipsis, polygons, and combinations thereof.

17. The method of claim 15 wherein the thickness of the resultant layer of foam rubber is from about 5 to about 500 mils and the thickness the resultant layer of solid rubber is from about 2 to about 50 mils.

18. The method of claim 17 wherein the mat further includes a second layer of solid rubber and the thickness of the resultant second layer of solid rubber is from about 2 to about 50 mils.

19. The method of claim 18 wherein the mat includes a second foam rubber layer and the thickness of the resultant first and second layers of foam rubber is from about 10 to about 1000 mils.

20. The method of claim 19 wherein the thickness of the resultant first and second layers of foam rubber is from about 75 to about 250 mils and the thickness of the resultant layer of solid rubber is from about 15 to about 25 mils.

21. A flashless mat produced by the method of claim 14.

22. The method of claim 14, wherein said at least one layer of rubber comprises at least one layer of unvulcanized rubber further comprising at least one blowing agent to form a closed-cell foam rubber structure upon vulcanization.

23. The method of claim 14, further comprising the steps of
   (d) providing a perforated fabric article, which is coated or comprised of a material which will not adhere to at least one surface of the at least one unvulcanized rubber layer after the vulcanization step;
   (e) providing a release bottom sheet between said perforated fabric article and a metal platen of a mat producing apparatus;
   (f) placing said at least one rubber layer on top of said perforated fabric article of step "d";
   (g) transporting the at least one rubber layer, perforated fabric article, and release bottom sheet composite to a vulcanization chamber; and (h) vulcanizing said at least one rubber layer as it remains on top of the perforated fabric article, thereby forming substantially flashless cleats through the perforations of said perforated fabric article;

wherein said fabric article and said release bottom sheet are comprised of or coated with materials which can withstand the temperatures and pressures associated with vulcanization and wherein the release bottom sheet is formed of a material and in such a manner as to allow air to escape during formation of the cleats and limits the flow of rubber or other mat material past the point of where the intended cleat is to form.

24. The floor mat of claim 1, wherein the perforated protrusions forming item is selected from a die, belt, or pad having a plurality of protrusion forming openings therethrough.

25. The floor mat of claim 24, wherein the plurality of protrusion forming openings are cylindrical.

26. A method of producing a flashless cleated rubber floor mat with a mat producing apparatus comprising the steps of:

(a) providing a perforated fabric article, which is coated or comprised of a material which will not adhere to at least one surface of at least one unvulcanized rubber layer after a vulcanization step;

(b) providing a release bottom sheet between said perforated fabric article and a metal platen of said apparatus;

(c) placing said at least one rubber layer on top of said perforated fabric article of step "a";

(d) transporting the at least one rubber layer, perforated fabric article, and release bottom sheet composite to a vulcanization chamber; and (e) vulcanizing said at least one rubber layer as it remains on top of the perforated fabric article, thereby forming substantially flashless cleats through the perforations of said perforated fabric article;

wherein said fabric article and said release bottom sheet are comprised of or coated with materials which can withstand the temperatures and pressures associated with vulcanization and wherein the release bottom sheet is formed of a material and in such a manner as to allow air to escape during formation of the cleats and limits the flow of rubber or other mat material past the point of where the intended cleat is to form.

27. The method of claim 26 wherein said perforated fabric article is made of fiberglass and coated with a coating which can withstand the high temperatures and pressures associated with rubber vulcanization and which will not appreciably adhere to molten rubber.

28. The method of claim 27 wherein said coating is polyfluoroethylene.

29. The method of claim 26 wherein said release bottom sheet is coated with silicon.

30. A flashless cleated rubber floor mat produced by the method of claim 26.

31. The floor mat of claim 30 comprising at least a rubber sheet component wherein said rubber comprises a plurality of cleats formed integrally on the surface and at least a portion of the surface of said rubber sheet also comprises a weave pattern of molded rubber.

32. The floor mat of claim 31 further comprising a pile fabric attached to said rubber sheet.

* * * * *